(12) United States Patent
Mori et al.

(10) Patent No.: US 8,593,202 B2
(45) Date of Patent: Nov. 26, 2013

(54) RINGING SUPPRESSION CIRCUIT

(75) Inventors: Hiroyuki Mori, Obu (JP); Hiroyuki Obata, Kariya (JP); Masahiro Kitagawa, Nukata (JP); Tomohisa Kishigami, Obu (JP); Tomoyuki Koike, Nagoya (JP); Noboru Maeda, Chiryu (JP); Youichirou Suzuki, Nishio (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/471,559

(22) Filed: May 15, 2012

(65) Prior Publication Data

US 2012/0293230 A1 Nov. 22, 2012

(30) Foreign Application Priority Data

May 16, 2011 (JP) .................................. 2011-109326
May 16, 2011 (JP) .................................. 2011-109327
Apr. 17, 2012 (JP) .................................... 2012-93863

(51) Int. Cl.
*H03K 5/08* (2006.01)
(52) U.S. Cl.
USPC .............................. 327/313; 327/389; 326/23
(58) Field of Classification Search
USPC ................................................. 327/313, 389
See application file for complete search history.

(56) References Cited

U.S. PATENT DOCUMENTS

| | | | |
|---|---|---|---|
| 5,359,294 A * | 10/1994 | Ganger et al. | 330/258 |
| 5,949,825 A | 9/1999 | Naffziger | |
| 6,326,803 B1 | 12/2001 | Takeda | |
| 2010/0124298 A1* | 5/2010 | Jang | 375/296 |
| 2010/0177829 A1* | 7/2010 | Suzuki et al. | 375/257 |
| 2011/0285424 A1* | 11/2011 | Suzuki et al. | 327/50 |

FOREIGN PATENT DOCUMENTS

| | | | |
|---|---|---|---|
| JP | 07273624 A | 10/1995 | |
| JP | 2005236915 A | 9/2005 | |
| JP | A-2010-103944 | 5/2010 | |

OTHER PUBLICATIONS

Office Action mailed Aug. 20, 2013 in the corresponding JP application No. 2011-109326 (English translation).
Office Action mailed Aug. 20, 2013 in the corresponding JP application No. 2012-093863 (English translation).

* cited by examiner

*Primary Examiner* — Long Nguyen
*Assistant Examiner* — Patrick Chen
(74) *Attorney, Agent, or Firm* — Posz Law Group, PLC

(57) ABSTRACT

An inter-line switching element formed of a MOSFET is provided between a pair of signal lines. When the level of a differential signal changes from high to low, a control circuit turns on the FET for a fixed period thereby to suppress ringing by decreasing the impedance between the signal lines when the level of the differential signal transitions, and causing the energy of the distortion of the differential signal waveform to be absorbed by the on-resistance of the FET.

2 Claims, 33 Drawing Sheets

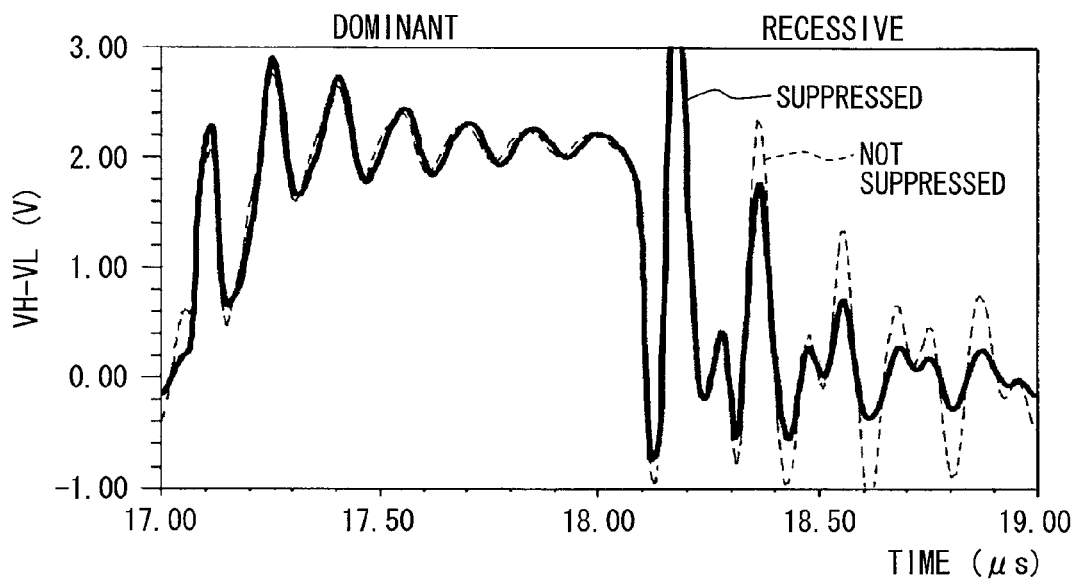
FIG. 19A   GROUND OFFSET : 0V
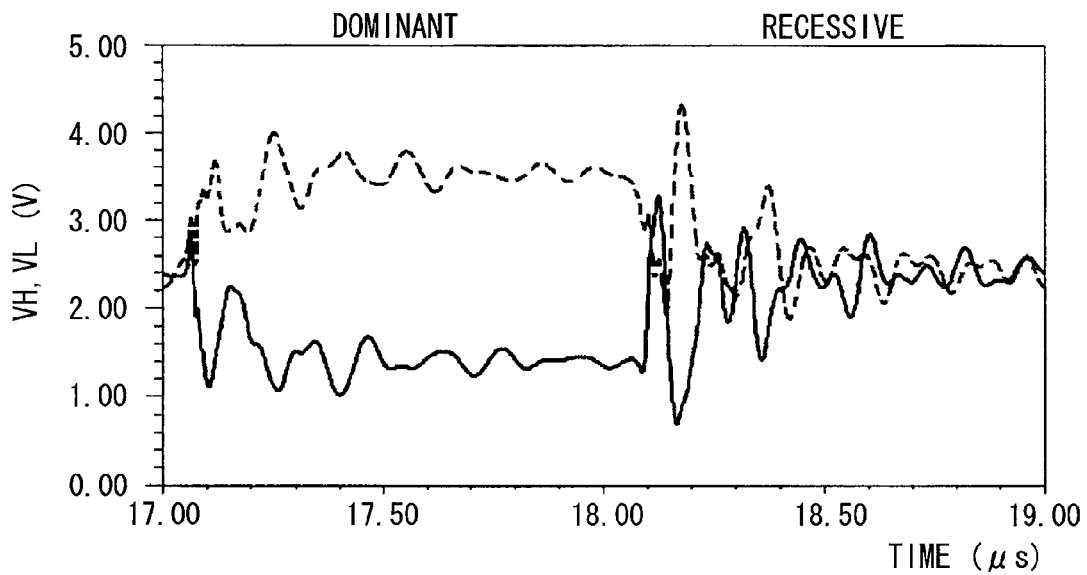
FIG. 19B   GROUND OFFSET : 0V

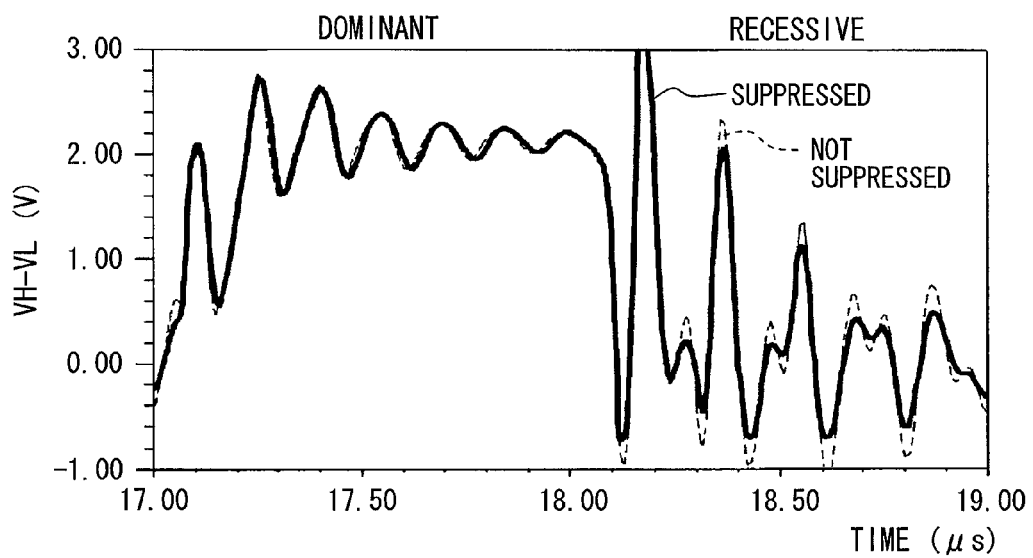
FIG. 20A  GROUND OFFSET : -7.5V
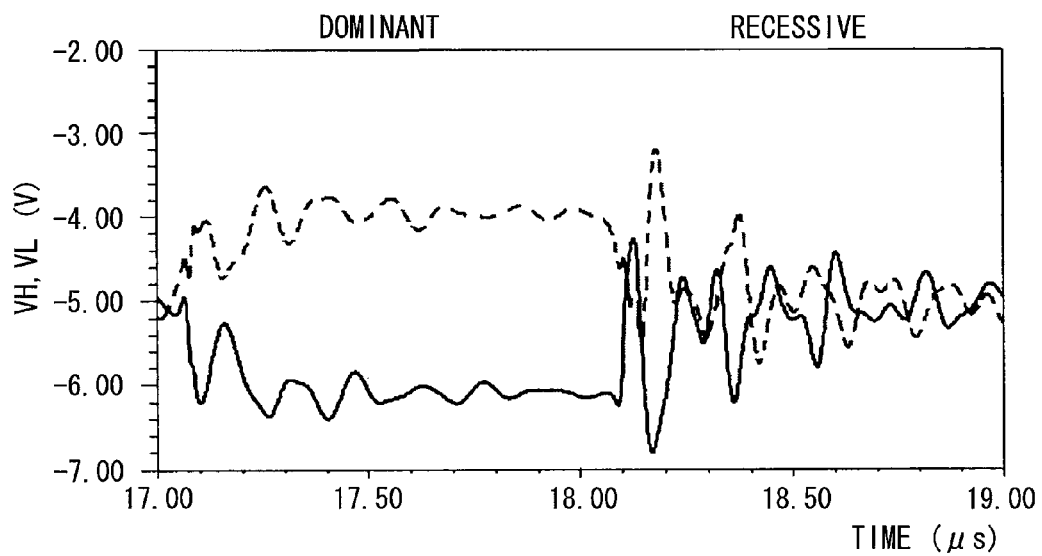
FIG. 20B  GROUND OFFSET : -7.5V

FIG. 21A  GROUND OFFSET : +9.5V
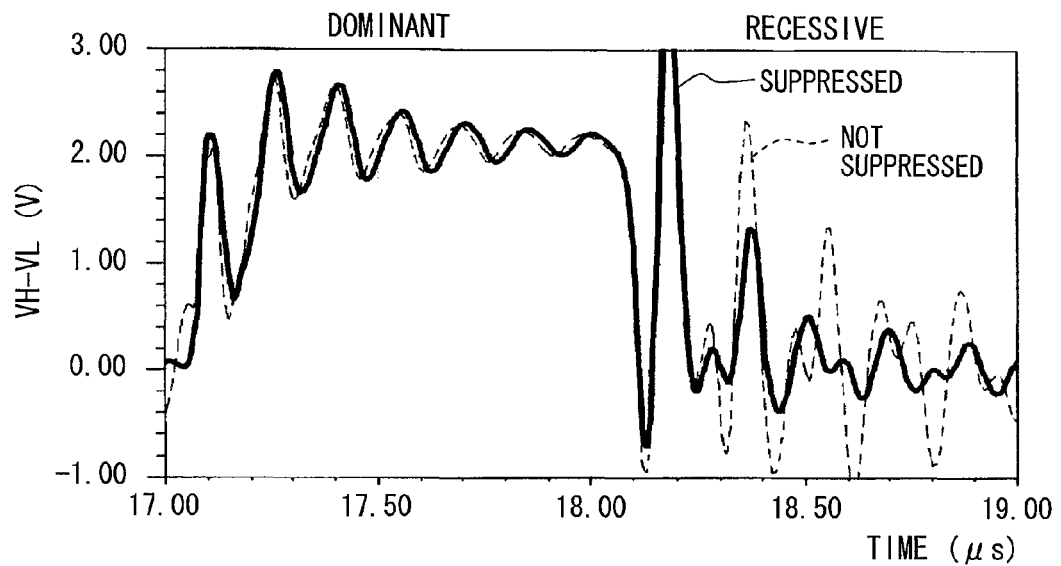
FIG. 21B  GROUND OFFSET : +9.5V
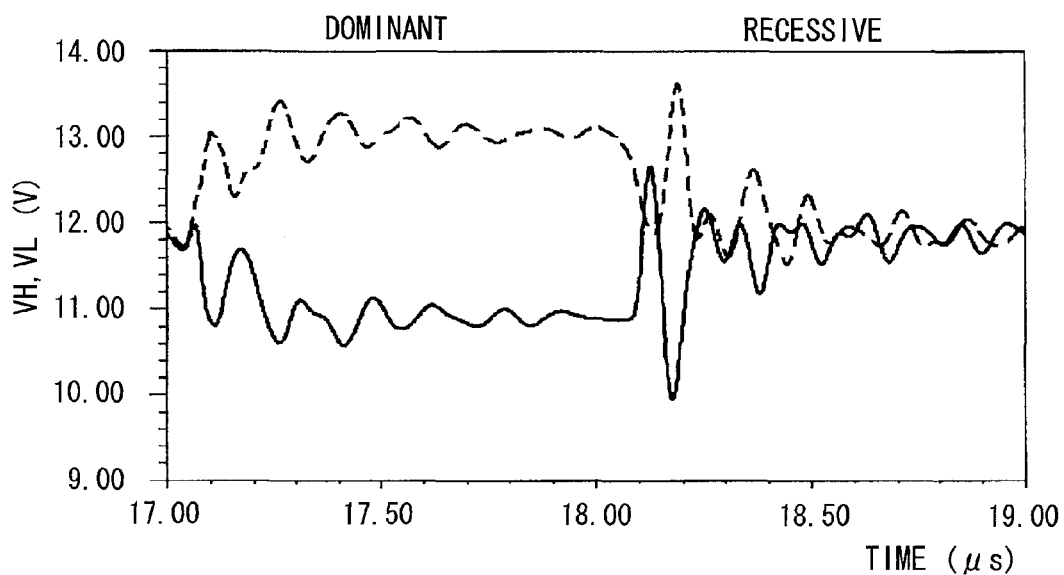

FIG. 23A  GROUND OFFSET : 0V
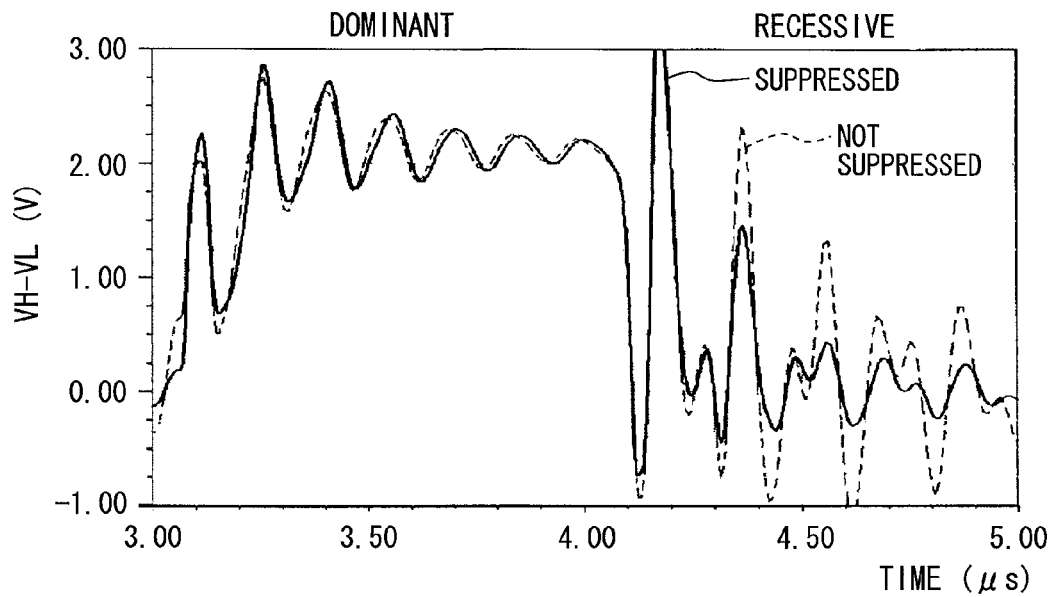
FIG. 23B  GROUND OFFSET : 0V
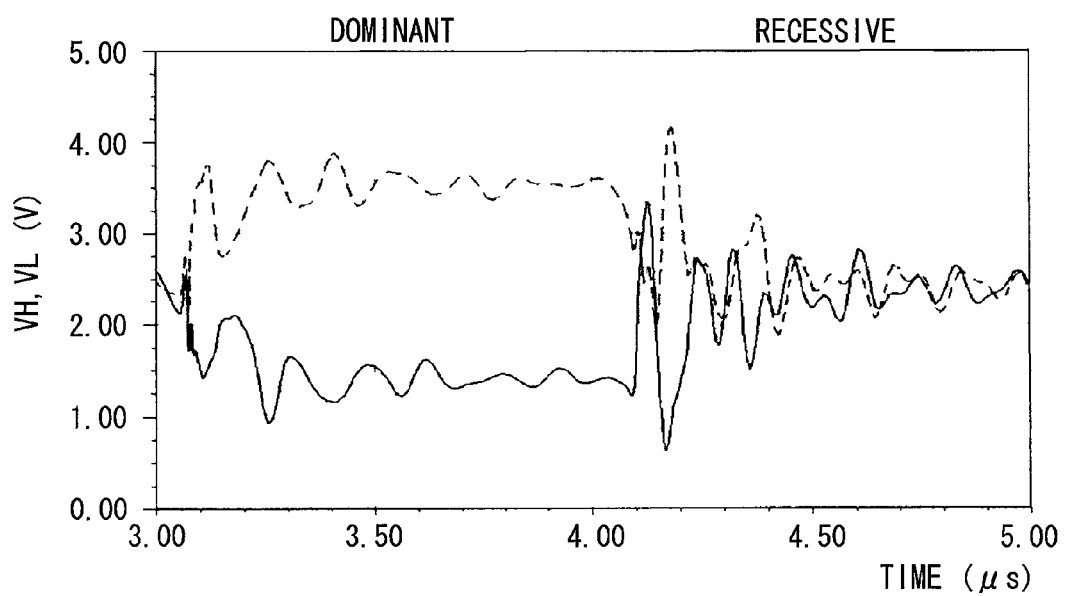

FIG. 24A GROUND OFFSET : −7.5V
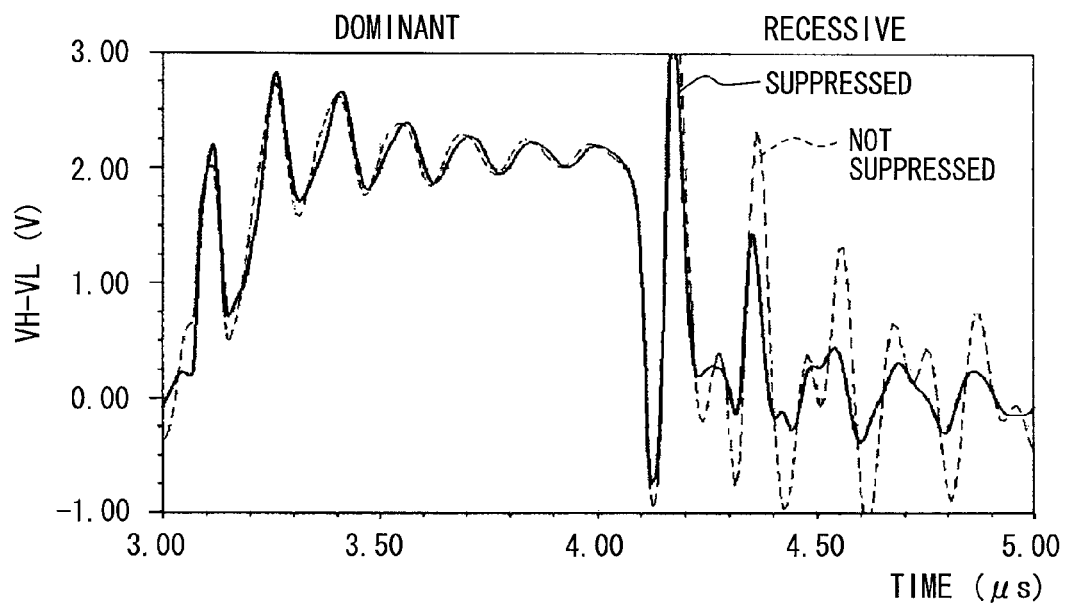
FIG. 24B GROUND OFFSET : −7.5V
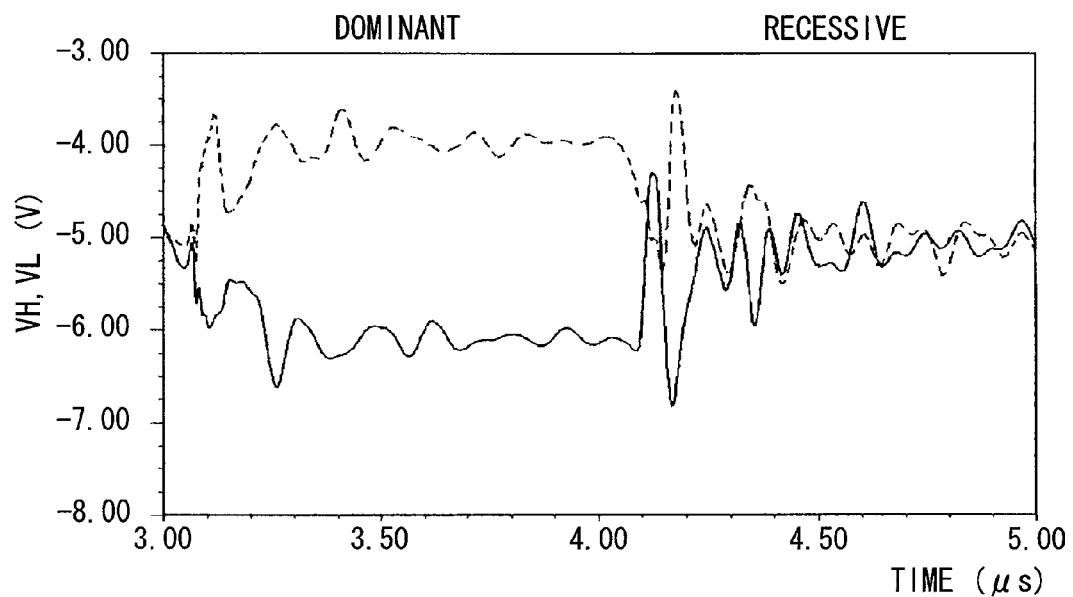

FIG. 25A   GROUND OFFSET : +9.5V
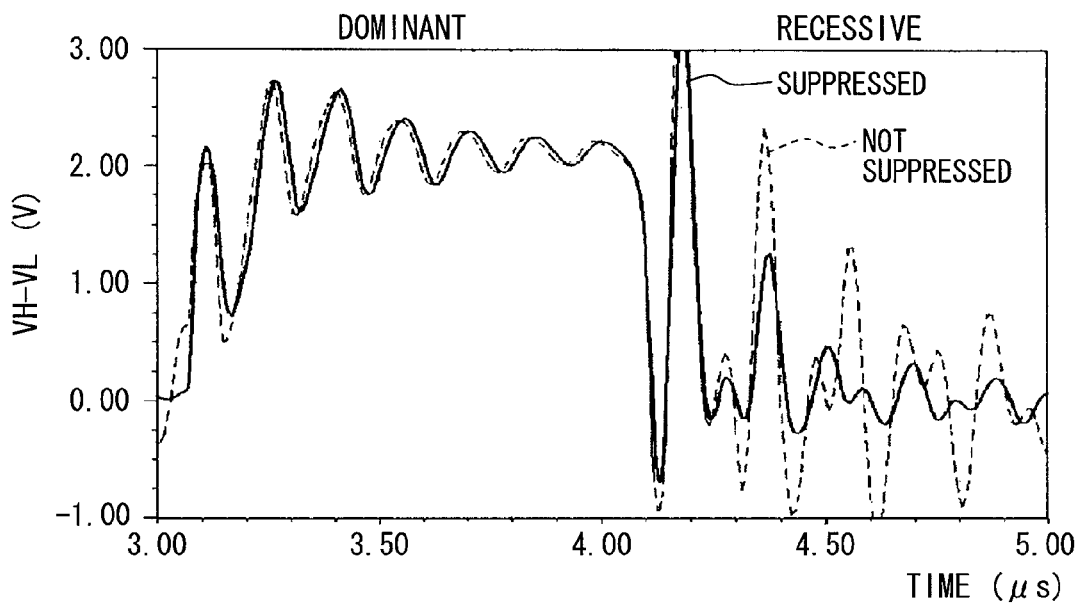
FIG. 25B   GROUND OFFSET : +9.5V
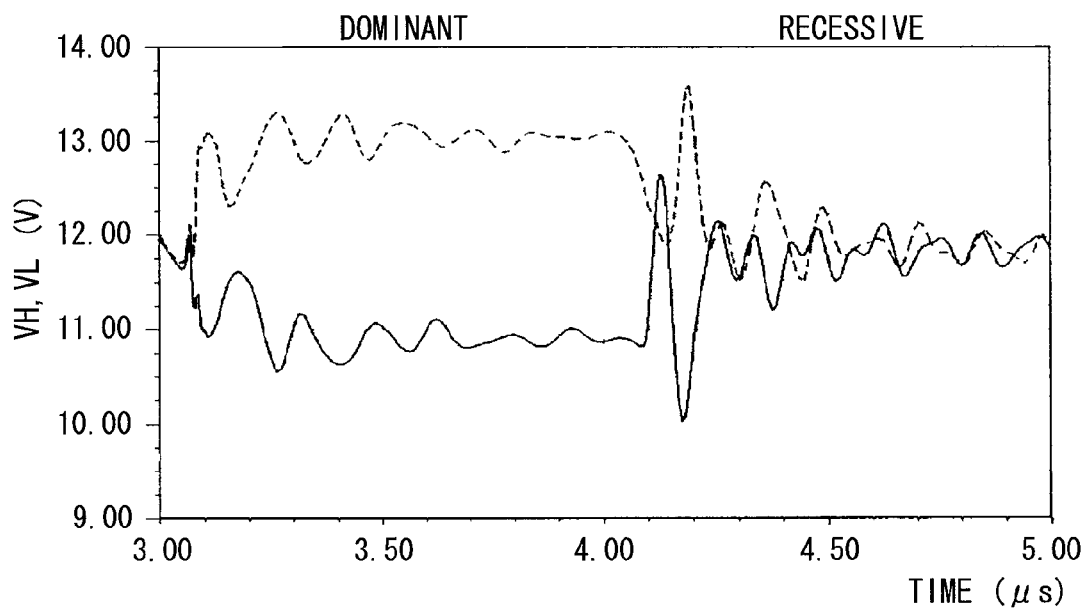

RINGING SUPPRESSION CIRCUIT

CROSS REFERENCE TO RELATED APPLICATION

This application is based on and incorporates herein by reference Japanese patent application No. 2011-109326 filed on May 16, 2011, No. 2011-109327 field on May 16, 2011 and No. 2012-93863 filed on Apr. 17, 2012.

TECHNICAL FIELD

The present disclosure relates to a ringing suppression circuit that is connected to a transmission line that transmits a differential signal by a pair of a high potential side signal line and a low potential side signal line, and that suppresses ringing that is generated along with the transmission of the signal.

BACKGROUND

In a case when a digital signal is transmitted via a transmission line, due to a portion of the signal energy being reflected when the signal level changes, distortions in the waveform such as overshoots and undershoots, that is, ringing, occur on the receiving side. Various proposals are made to suppress waveform distortion, for example, in the following patent documents.

[Patent Document 1] JP 2001-127805A (U.S. Pat. No. 6,326,803B1)

[Patent Document 2] JP 2010-103944A

For example, in patent document 1, in a case when the voltage level of the signal transitions between high and low in a terminal circuit of a transmission path, the impedance of a terminal is temporarily decreased during a delay time that is conferred by a delay circuit. Further, an auxiliary switching circuit is connected in parallel to a terminal switching circuit that is used in the prior art. Four MOSFETs are connected to the auxiliary switching circuit in series between a power source Vcc and a ground, and the switching control thereof is performed by a signal that is transmitted to the terminal and a signal in which such a signal is delayed and inverted by inverters in a series of three. However, with such a configuration, when the terminal is temporarily connected to the power source Vcc or the ground, the on-resistance of the plurality of MOSFETs is transiently connected between both parts in series or in both series and parallel. It is therefore not possible to sufficiently decrease the impedance of the terminal. While it is necessary to increase the size of the FETs in order to decrease the on-resistance, the size of the terminal circuit would inevitably increase.

Further, in patent document 2, a switch is connected between a high voltage signal line and a low voltage signal line that transmit a differential signal. When a waveform distortion detection unit detects that the relative size of the voltage between the lines and has been reversed, the switch is closed and short-circuiting is caused between the lines and. If, short-circuiting is caused between the lines and the impedance between the lines becomes zero, the distortion in the signal waveform in the vicinity of the node that receives the transmitted signal can be reduced. However, since the energy of the distortion components of the waveform is not consumed in the case of a short circuit, the energy is reflected at the short circuit point and reaches the side of the node that has transmitted the signal. This is adversary to other nodes.

SUMMARY

It is therefore an object to provide a ringing suppression circuit that consumes only energy of waveform distortion to reliably suppress ringing with a simpler configuration.

A ringing suppression circuit is provided for suppressing ringing generated in transmission of a differential signal through a transmission line, which is formed of a pair of a high potential side signal line and a low potential side signal line. The ringing suppression circuit comprises an inter-line switching device of a voltage driven type connected between the pair of signal lines, and a control section for simultaneously turning on the inter-line switching device for a fixed period when a change in a level of the differential signal is detected. The inter-line switching device may be a set of a first and a second inter-line switching elements, which are connected in series, or a single inter-line switching element.

BRIEF DESCRIPTION OF THE DRAWINGS

The above and other objects, features and advantages will become more apparent from the following description made with reference to the accompanying drawings. In the drawings:

FIGS. 19A and 19B are time charts that illustrate the simulation results of the circuit of FIG. 17A in the case of a ground offset of 0 V.

FIGS. 20A and 20B are time charts that illustrate the simulation results of the circuit of FIG. 17A in the case of a ground offset of −7.5 V;

FIGS. 21A and 21B are time charts that illustrate the simulation results of the circuit of FIG. 17A in the case of a ground offset of +9.5 V;

FIGS. 23A and 23B are time charts that illustrate the simulation results of the circuit of FIG. 17A in the case of a ground offset of 0 V;

FIGS. 24A and 24B are time charts that illustrate the simulation results of the circuit of FIG. 17A in the case of a ground offset of −7.5 V; and FIGS. 25A and 25B are time charts that illustrate the simulation results of the circuit of FIG. 17A in the case of a ground offset of +9.5 V.

DETAILED DESCRIPTION

A ringing suppression circuit will be described in detail with reference to various embodiments shown in the accompanying drawings.

(First Embodiment)

Figure 1:
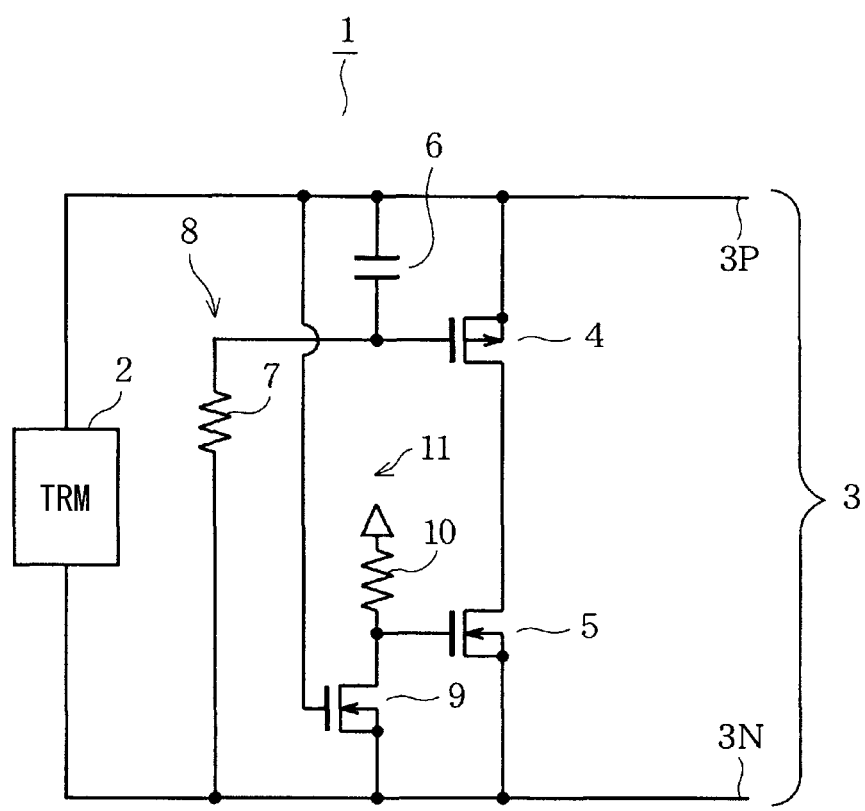
FIG. 1 is a circuit diagram of a ringing suppression circuit according to a first embodiment.

Referring to FIG. 1 showing a first embodiment, a ringing suppression circuit 1 is connected in parallel on a transmission line 3 composed of a transmission circuit (or a receiving circuit) 2, as well as a high potential side signal line 3P and a low potential side signal line 3N. The ringing suppression circuit 1 includes a P-channel metal-oxide-semiconductor field-effect transistor (MOSFET) 4 and an N-channel MOSFET 5 (first and second inter-line switching elements) that are connected in series on the transmission line 3 with a common drain (non-reference side conductive terminal).

Further, a series circuit of a capacitor 6 and a resistor 7 is connected on the transmission circuit 3, and the common connection point of each is connected to the gate (control terminal) of the FET 4. The series circuit configures a delay circuit 8. The source (potential reference side conductive terminal) of an N-channel MOSFET 9 (inversion circuit, control switching element) is connected to the signal line 3N, the drain is pulled up to a high level (power source level) via a resistor 10, and the gate is connected to the signal line 3P. Here, the delay circuit 8, the FET 9, and the resistor 10 configure a control circuit (control section) 11.

Next, the operations of the first embodiment will be described with reference to FIG. 2. As with a CAN (controller area network) that is an on-board LAN, for example, the transmission line 3 transmits binary signals (pulse signals) of a high level and a low level as a differential signal by the transmission line 3. For example, in a case when the power source voltage is 5 V, the signal line 3P (CAN-H) and the signal line 3N (CAN-L) are both set to 2.5 V that is an intermediate potential in a non-driven state, the differential voltage is 0 V and hence the differential signal is at the low level (recessive).

Furthermore, if the transmission circuit 2 drives the transmission line 3, for example, the signal line 3P is driven at equal to or greater than 3.5 V, for example, the signal line 3N is driven at equal to or less than 1.5 V, for example, the differential voltage becomes equal to or greater than 2 V, and the differential signal becomes the high level (dominant). Further, although not shown, one end of both the signal line 3P and the signal line 3N is terminated by a resistor with 120Ω. Therefore, when the differential signal level changes from high to low, since the transmission line 3 becomes the non-driven state and the impedance of the transmission line 3 becomes high, ringing is generated on the differential signal waveform.

Figure 2:
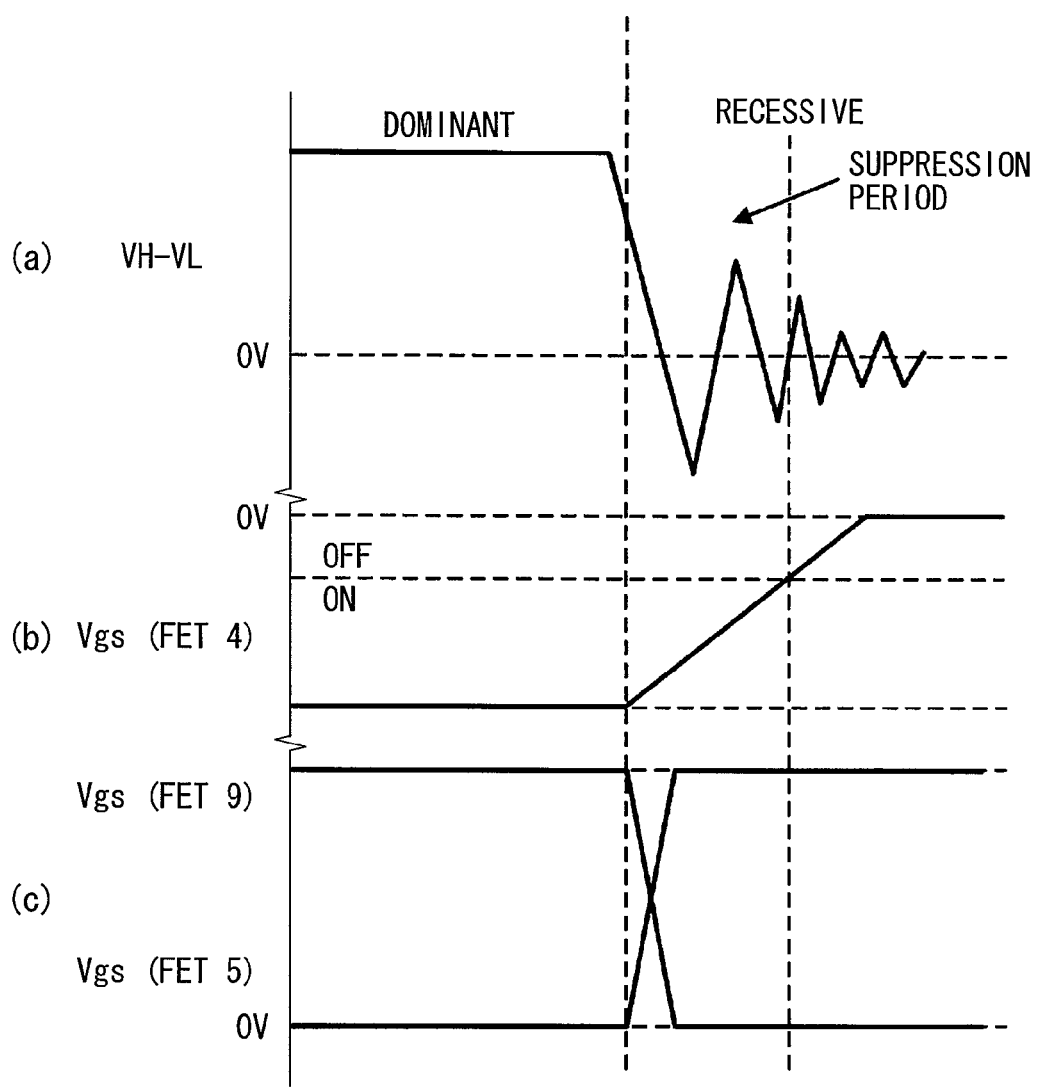
FIG. 2 is a time chart that shows an operation of the ringing suppression circuit shown in FIG. 1.

In FIG. 2, (a) shows the differential signal level change from high to low, (b) shows a gate-source voltage Vgs of the FET (PMOS) 4, and (c) shows gate-source voltages Vgs of the FET 9 and FET 5. In a case when the differential signal level is high, the FET 9 is on, the FET 5 is off. Further, as shown in (b), since the gate potential (negative potential) Vg of the source reference of the FET 4 has sufficient charging voltage of the capacitor 6, the FET 4 is on. The differential signal level change in (a) corresponds to a differential voltage VH−VL between a potential VH at the high side signal line 3P and a potential VL at the low side signal line 3L.

If the differential signal level changes from high to low as shown in (a), the FET 9 is turned off and the FET 5 is turned on as shown in (c). The signal line 3P and the signal line 3N are then connected via the on-resistance of the FET 4 and the FET 5, and the impedance decreases. Thus, ringing is suppressed by the energy of the waveform distortion that is generated during the falling period during which the differential signal level changes from high to low, being consumed by the on-resistance.

Furthermore, since the charge of the capacitor 6 is discharged via the resistor 7, the absolute value of the voltage Vgs between the gate and the source of the FET 4 gradually decreases, and the MOSFET 4 is turned off when the absolute value becomes less than an on/off threshold value. Therefore, the signal line 3P and the signal line 3N are connected via the on-resistance of the FET 4 and the FET 5 only during the distortion suppression period in which both of the FET 4 and the FET 5 are on, decreasing the impedance.

According to the first embodiment described above, a series circuit of the FET 4 and the FET 5 is connected between the pair of signal lines 3P and 3N. When the control circuit 11 detects that the level of the differential signal has changed from high to low, the FET 4 and the FET 5 are simultaneously turned on for a fixed period. Thus, the generation of ringing can be reliably suppressed by greatly reducing the impedance between the signal lines 3P and 3N during a period when the level of the differential signal transitions and causing the energy of the distortion of the differential signal waveform to be absorbed by the on-resistance of the FETs 4 and 5.

Furthermore, the control circuit 11 is configured to include the FET 9 that inverts and outputs the level of the differential signal and the delay circuit 8 that outputs the level of the differential signal after delaying for the fixed period. The FET 9 is then turned off and the FET 5 is turned on, the delay circuit 8 is configured by a series circuit of the capacitor 6 and the resistor 7 which is connected between the signal lines 3P and 3N, and the common connection point of both is connected to the gate of the FET 4.

That is, when the differential signal is in a high level state, the capacitor 6 is in a charged state. The FET 4 is thus on, and the FET 9 is on and the FET 5 is off. When the level of the differential signal changes to low, the MOSFET 9 immediately turns on and both FETs 4 and 5 turn on. When the fixed period of time passes from such a point, the FET 4 is turned off and the ringing suppression operation is stopped. Therefore, the period in which the ringing suppression operation is effective can be adjusted by the time constant of the delay circuit 8.

(Second Embodiment)

Figure 3:
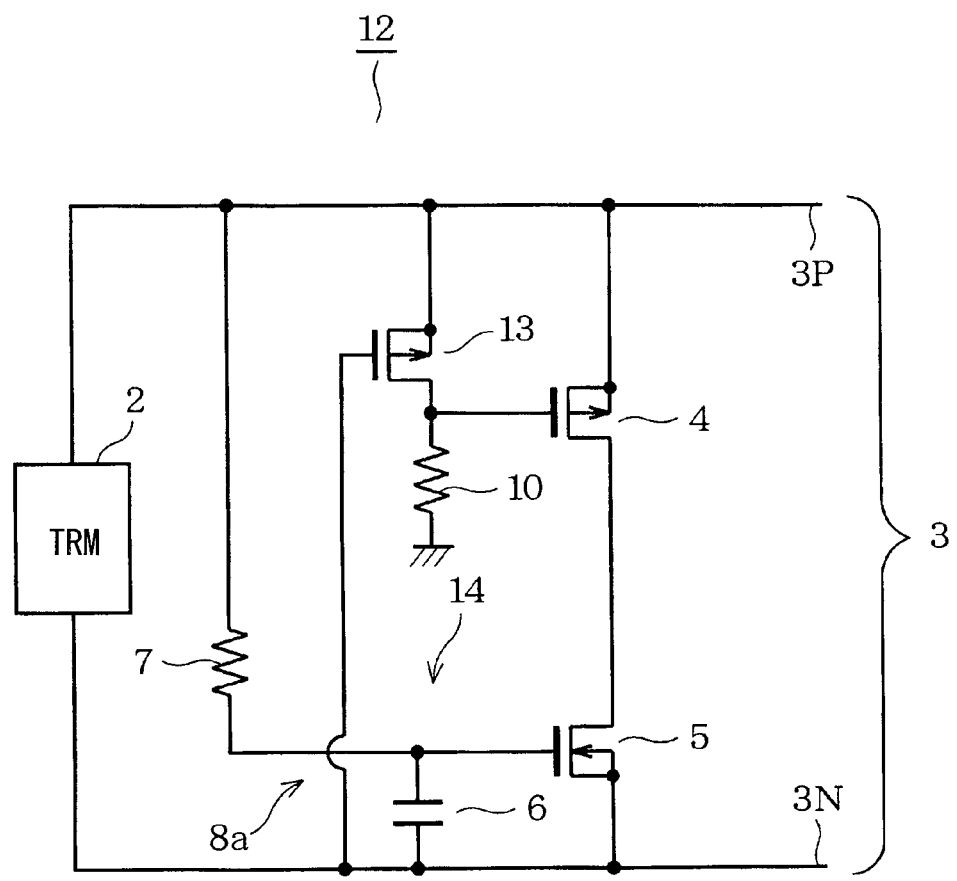
FIG. 3 is a circuit diagram of a ringing suppression circuit according to a second embodiment.

According to a second embodiment shown in FIG. 3, a ringing suppression circuit 12 is configured so that the on and off states of the FET 4 and the FET 5 become the reverse of the first embodiment.

That is, the source of a P-channel MOSFET (inverse circuit, control switching element) 13 that replaces the FET 9 is connected to the signal line 3P, the gate is connected to the signal line 3N, and the drain is connected to the gate of the FET 4 while also being pulled down by the ground potential via the resistor 10. Further, the gate of the FET 5 is connected to the signal line 3P via the resistor 7 while also being connected to the signal line 3N via the capacitor 6. Further, the series circuit of the resistor 7 and the capacitor 6 configures a delay circuit 8a. Furthermore, the delay circuit 8a and the FET 13 configure a control circuit (control section) 14.

In the second embodiment, when the differential signal is high, the FET 13 is on and the FET 4 is off. Further, since the gate potential of the FET 5 is the charging voltage of the capacitor 6, that is, equivalent to the high level, the FET 5 is on. If the differential signal level changes from high to low in such a state, the FET 13 is turned off and the FET 4 is turned on. Ringing is then suppressed, because the signal line 3P and the signal line 3N are connected via the on-resistances of the FET 4 and the FET 5 and the energy of the waveform distortion that is generated during the falling period of the differential signal is consumed by the on-resistances.

Furthermore, since the charge of the capacitor 6 is discharged via the resistor 7, the gate potential of the FET 5 gradually decreases. When the gate potential becomes less than a threshold value, the FET 5 is turned off. Therefore, similarly to the first embodiment, the signal line 3P and the signal line 3N are connected via the on-resistances of the FET 4 and the FET 5 only during the period when both of the FET 4 and the FET 5 are on.

According to the second embodiment described above, the inversion circuit is configured by the FET 13 that is connected to the FET 4. The source of the FET 13 is connected to the signal line 3P, the drain is pulled down via the resistor 10 as well as being connected to the gate of the FET 13, and the gate of the FET 13 is connected to the signal line 3N. Thus, since the inversion signal of the differential signal level is output to the drain of the FET 13, that is, to the gate of the FET 4, the same effects as the first embodiment are provided.

(Third Embodiment)

Figure 4:
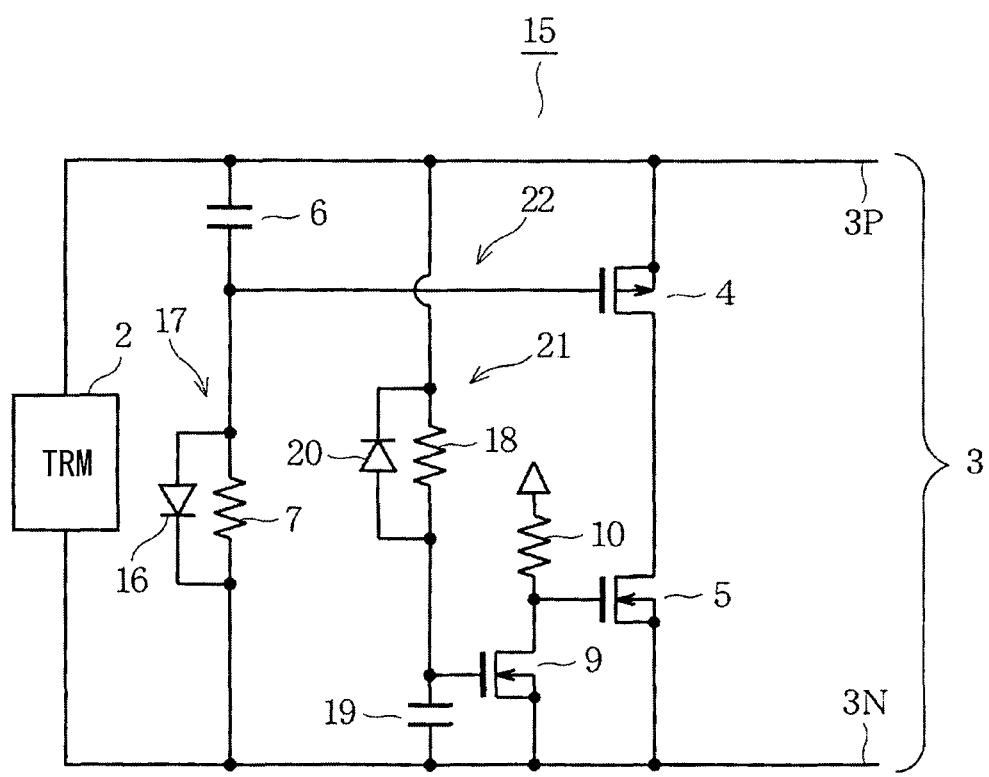
FIG. 4 is a circuit diagram of a ringing suppression circuit according to a third embodiment.

According to a third embodiment shown in FIG. 4, a ringing suppression circuit 15 configures a delay circuit 17 by connecting a diode 16 to the resistor 7 in parallel in the ringing suppression circuit 1 of the first embodiment. Further, the gate of the FET 9 is connected to the signal line 3P via a resistor 18 while also being connected to the signal line 3N via a capacitor 19. A diode 20 is connected to the resistor 18 in parallel.

Here, the FET 9, the resistors 10 and 18, the capacitor 19 and the diode 20 configure an inversion circuit 21. Here, the diode 16 is connected so that the anode is on the signal line 3P side and the diode 20 is connected so that the anode is on the signal line 3N side. Furthermore, the delay circuit 17 and the inversion circuit 21 configure a control circuit (control section) 22.

In the first embodiment, if an overshoot occurs after the signal waveform has fallen when the differential signal level changes from high to low, the FET 9 turns on and the FET 5 turns off. It is thus assumed that the ringing suppression effect is reduced. Therefore, as opposed to the first embodiment, in which the gate of the FET 9 is directly connected to the signal line 3P, the gate of the FET 9 is connected to a common connection point of the resistor 18 and the capacitor 19 in the third embodiment.

Thus, since the charging of the capacitor 19 is performed via the resistor 18 in a case when the differential signal level changes from low to high, the increase in the gate potential is moderated. In a case when the differential signal level changes from high to low, the discharging of the capacitor 19 is performed rapidly via the diode 20 bypassing the resistor 18. Therefore, even if ringing is caused to be suppressed immediately as the differential signal falls and an overshoot is generated following the fall, the on-state of the FET 4 and the FET 5 is maintained as much as possible to continue the ringing suppression operation.

Further, due to the operation of the delay circuit 17, in a case when the differential signal level changes from low to high, the charging of the capacitor 6 is performed rapidly via the diode 16 during a period when the terminal voltage of the resistor 7 is equal to or greater than the forward voltage. When the charging of the capacitor 6 progresses and the terminal voltage becomes less than the forward voltage, the charging slows as the charging current flows via the resistor 7. Therefore, the delay time that is conferred becomes slightly shorter than in the case of the first embodiment.

According to the third embodiment described above, the series circuit of the resistor 18 and the capacitor 19 that are connected between the signal line 3P and the signal line 3N are included as the inversion circuit 21, and the gate of the FET 9 is connected to the common connection point of the series circuit. Therefore, in a case when an overshoot is generated after the differential signal waveform has fallen, the FET 9 is suppressed from turning on in compliance with the overshoot, and the FET 5 can be prevented from temporarily turning off.

Further, since the diode 20 is connected to the resistor 18 in parallel in the direction of the signal line 3N side, even in a case when a series circuit that delays the follow-up operation with respect to the generation of the overshoot is provided, it is possible to rapidly perform an inversion of the signal at the time of the differential signal level transition from high to low. In addition, the delay time that is conferred can be adjusted by connecting the diode 16 in parallel to the resistor 7 that configures the delay circuit 17.

(Fourth Embodiment)

Figure 5:
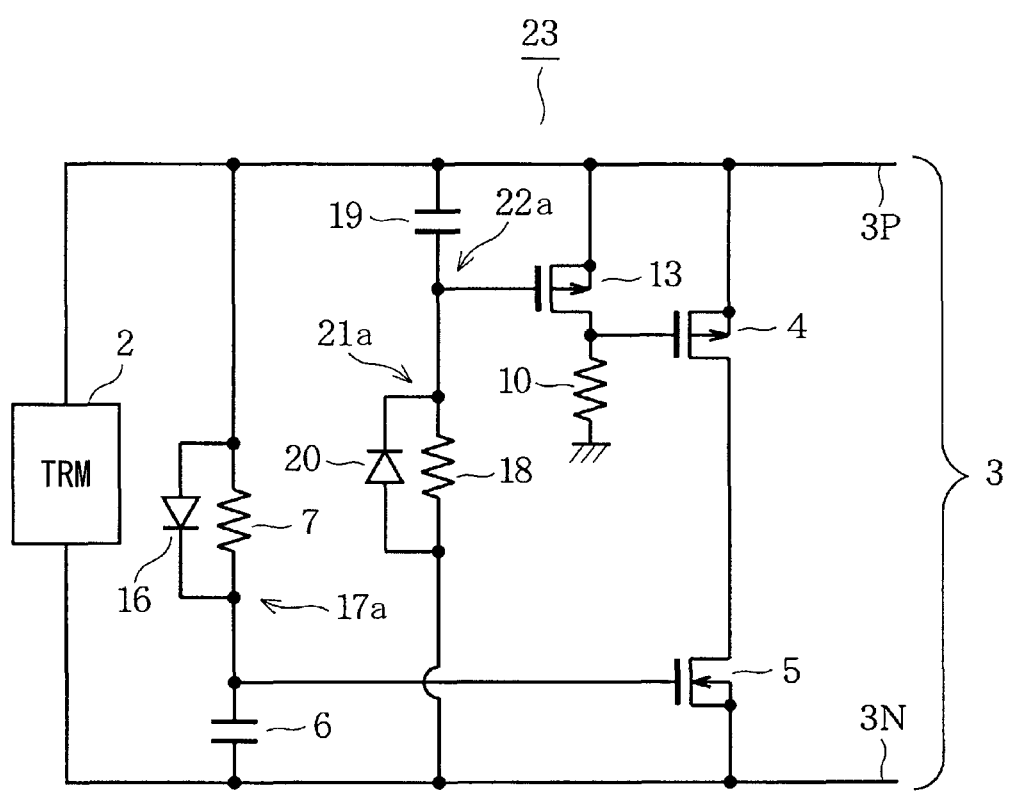
FIG. 5 is a circuit diagram of a ringing suppression circuit according to a fourth embodiment.
Figure 6:
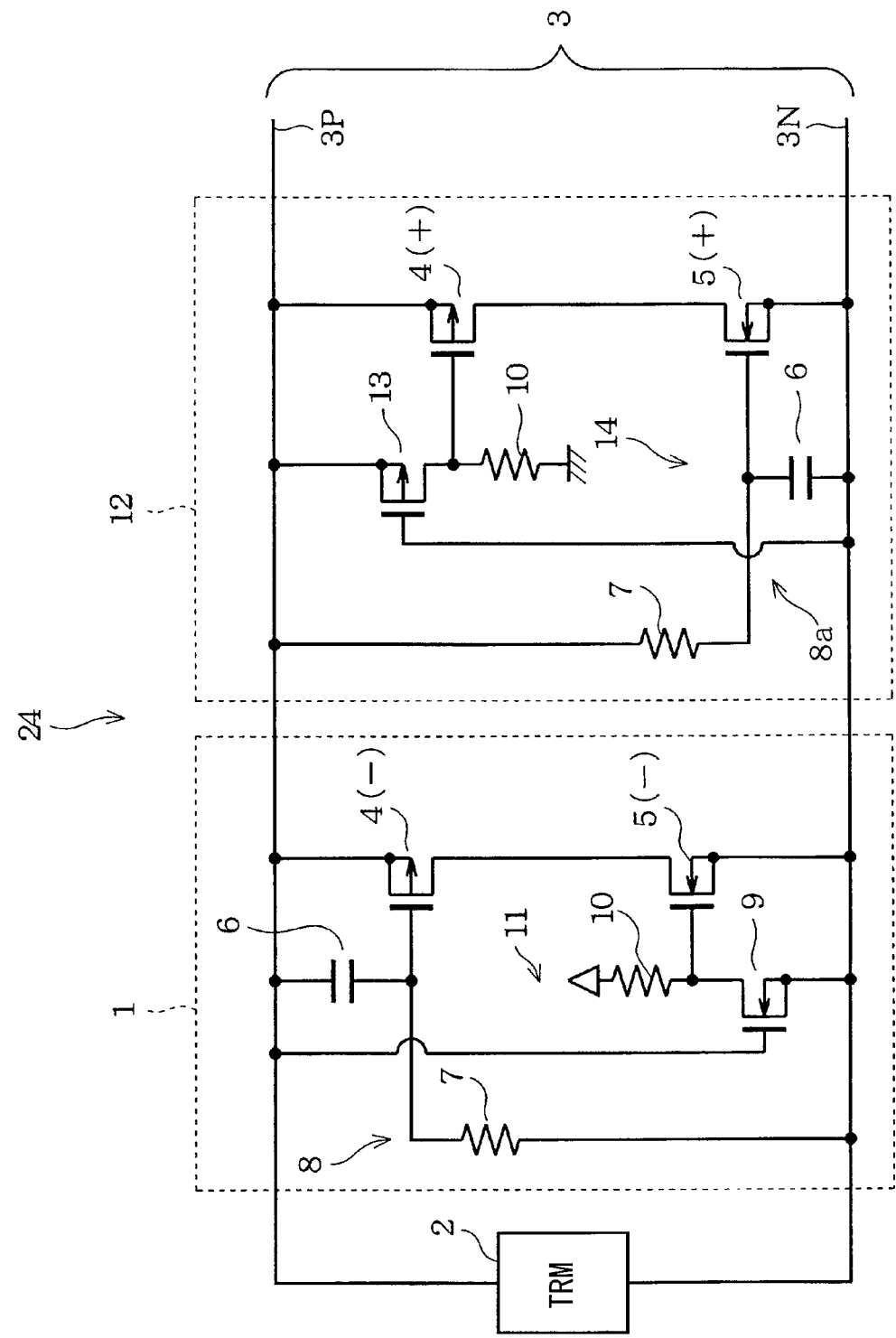
FIG. 6 is a circuit diagram of a ringing suppression circuit according to a fifth embodiment.

According to a fourth embodiment shown in FIG. 5, similarly to the third embodiment, a ringing circuit 23 has a configuration, in which a delay circuit is added to the ringing suppression circuit 12 of the second embodiment. That is, a delay circuit 17a is configured by connecting the diode 16 to both ends of the resistor 7 in the same direction as in the fourth embodiment. Further, the connection order of the resistor 16 and the capacitor 19 in the delay circuit 21 of the third embodiment is reversed to configure a delay circuit 21a, and the common connection point of both is connected to the gate of the FET 13. Furthermore, the delay circuit 17a and the inversion circuit 21a configure a control circuit (control section) 22a.

According to the fourth embodiment, the same effects as the third embodiment are also provided with the configuration of the second embodiment.

(Fifth Embodiment)

According to a fifth embodiment shown in FIGS. 6 to 9, a ringing suppression circuit 24 is configured by the ringing suppression circuit 1 of the first embodiment and the ringing suppression circuit 12 of the second embodiment. The ringing suppression circuits 1 and 12 are connected in parallel on the transmission line 3. Further, the same symbols as with the ringing suppression circuits 1 and 12 are distinguished by adding (−) to the symbols of the former and (+) to the symbols of the latter. In such a case, the series circuit of the FET 4(−) and the FET 5(−) equates to a first series circuit, and the series circuit of the FET 4(+) and the FET 5(+) equates to a second series circuit. Further, the control circuit 11 of the ringing suppression circuit 1 equates to a first control section, and the control circuit 14 of the ringing suppression circuit 12 equates to a second control section.

By adopting such a configuration, the following effects are provided. In the case of a configuration in which a communication node is arranged at each portion of a vehicle as with the transmission line 3 of an on-board local area network (LAN), it is assumed that the potential of the ground that is connected to each communication node is different (ground offset). In the case of the ringing suppression circuit 1, the gate of the FET 5 is pulled up to the power source level. Therefore, if the potential of the signal line 3N rises when the differential signal indicates the high level, that is, in a state in which the ground level of the transmission node is higher than the ground level of the own node, the potential difference between the gate and the source becomes small. It becomes difficult for the FET 5 to maintain an on-state. However, at such a time, with the ringing suppression circuit 12, there is no influence on the operation of the FET 5 that operates by the differential voltage. With the FET 4, in which the gate is pulled down to the ground level of the own node, the FET 4 can operate normally since the source potential has effectively increased.

Further, the relationship described above is reversed in a case when the ground level of the transmission node is lower than the ground level of the own node. By the potential difference between the gate and the source of the FET 5 of the ringing suppression circuit 1 becoming large, there are no problems with the operation. On the other hand, the potential difference between the gate and the source of the FET 4 of the ringing suppression circuit 11 becomes small, making operations difficult. Therefore, by connecting the ringing suppression circuits 1 and 12 in parallel, even in a case when there is a ground offset between the communication nodes, at least one of the ringing suppression circuits 1 and 12 reliably operates and a ringing suppression effect is reliably provided.

Figure 7A:
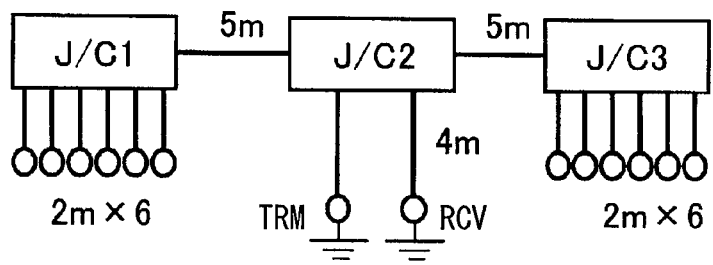
FIGS. 7A to 7C are a circuit diagram and time charts of simulation results of the operation of the circuit of FIG. 7A.
Figure 7B:
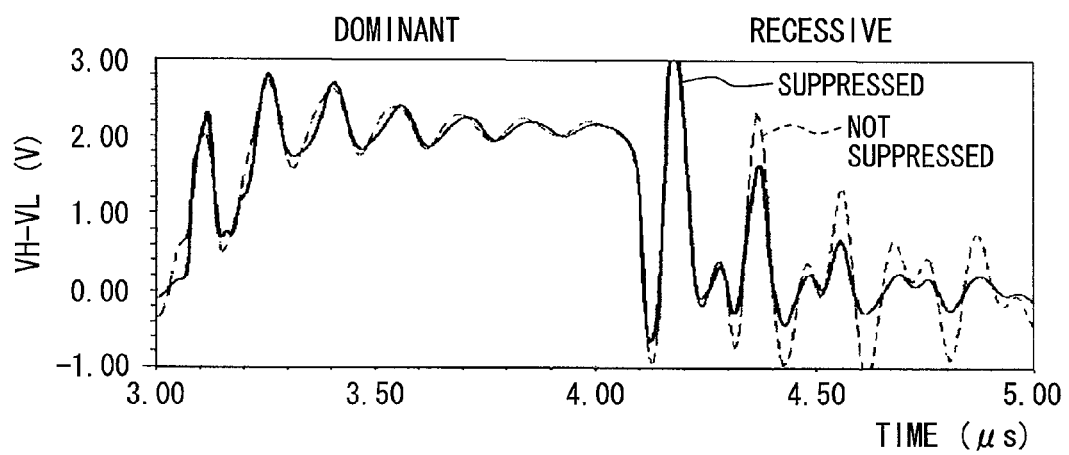
Figure 7C:
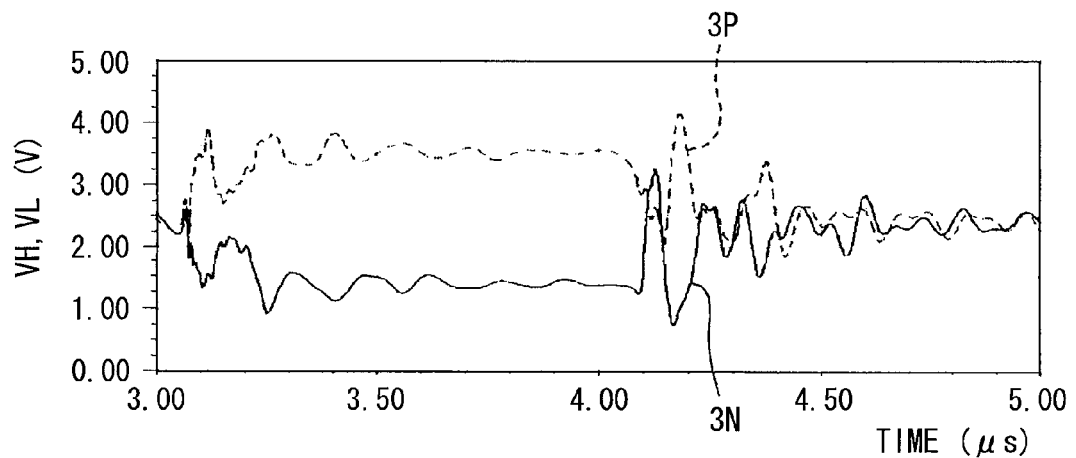

The results of simulation of the operation of the ringing suppression circuit 24 are shown in FIGS. 7A to 7C. A network model of a CAN that is used for the simulation is shown in FIG. 7A. Three connection point connectors J/C1, J/C2, and J/C3 are connected by 5 m transmission lines, and six communication nodes are respectively all connected to the connection point connectors J/C1 and J/C3 via 2 m transmission lines. Furthermore, a transmission node (TRM) and a receiving node (RCV) are respectively connected to the connection point connector J/C2 via 4 m transmission lines, and the ringing suppression circuit 24 is connected to the transmission line on the receiving node side.

FIG. 7B is the simulation result in a case when there is no offset to the ground level of the transmission node or the receiving node. A solid line indicates a case when the ringing suppression circuit 24 is connected and distortion is suppressed. A dotted line indicates a case when the ringing suppression circuit 24 is not connected and distortion is not suppressed. FIG. 7B is the voltage waveform in a case when the differential signal (VH−VL) between the signal lines 3P and 3N changes from dominant to recessive. FIG. 7C is the respective voltage waveforms VH and VL of the signal line 3P and 3N (CAN-H, CAN-L) at such a time. As shown in FIG. 7C, it can be seen that the fluctuations in the voltage waveform converge more quickly (distortion is suppressed) after switching to recessive as indicated by the solid lime.

Figure 8A:
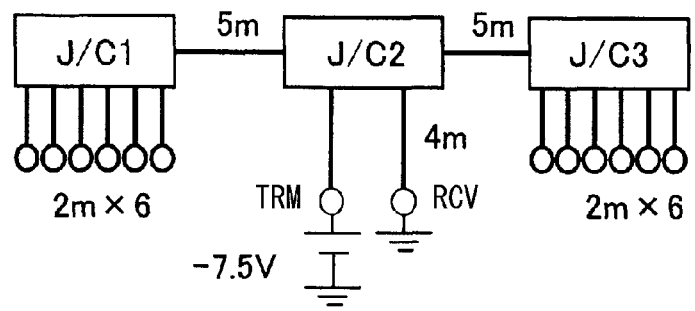
FIGS. 8A to 8C are a circuit diagram and time charts of simulation results of the operation of the circuit of FIG. 8A.
Figure 8B:
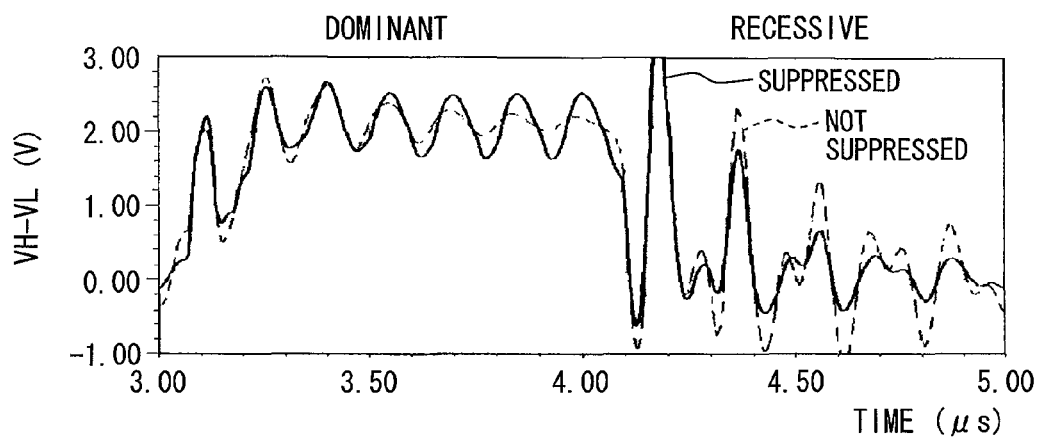
Figure 8C:
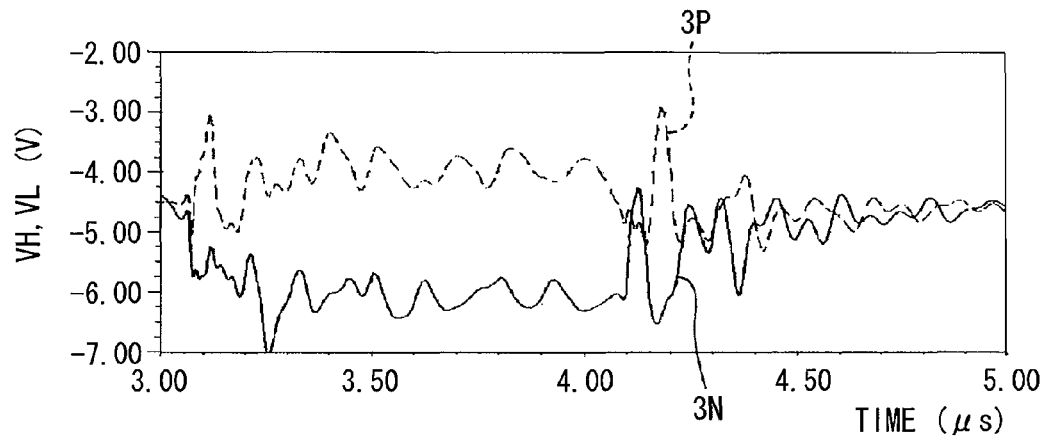
Figure 9A:
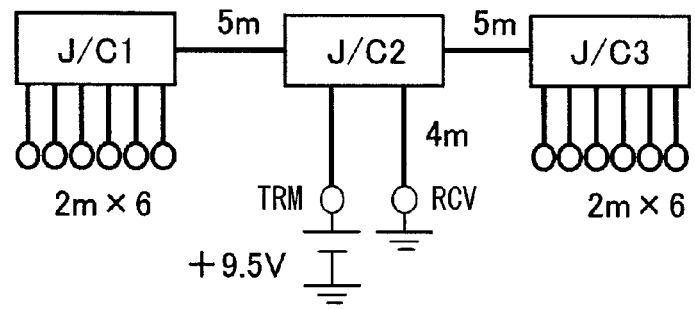
FIG. 9A to 9C are a circuit diagram and time charts of simulation results of the operation of the circuit of FIG. 9A.
Figure 9B:
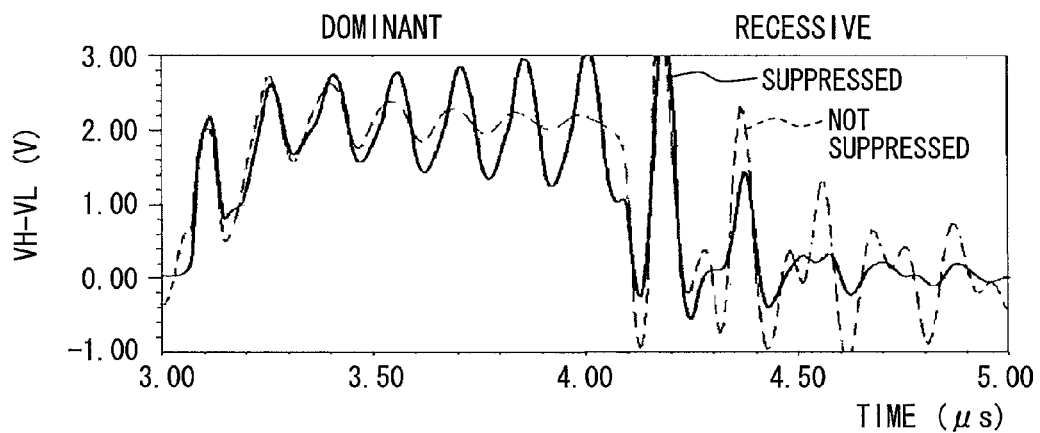
Figure 9C:
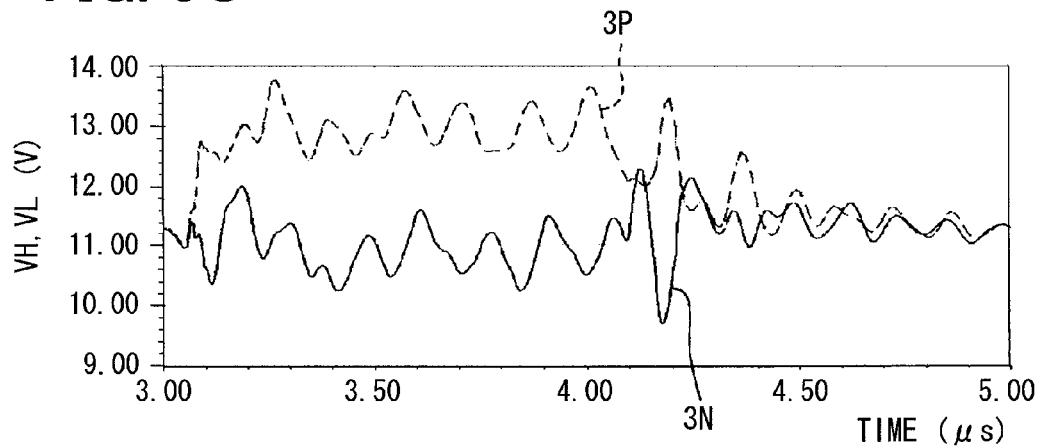

FIGS. 8A to 8C are diagrams that are the equivalents of FIGS. 7A to 7C, in a case when the ground level of the transmission node is lower than the ground level of the receiving node by 7.5 V. As shown in FIG. 8C, the voltage waveforms of the signal lines 3P and 3N are differential voltages with −5 V as the center. Further, FIGS. 9A to 9C are diagrams that are the equivalents of FIGS. 7A to 7C, in a case when the ground level of the transmission node is higher than the ground level of the receiving node by 9.5 V. As shown in FIG. 9C, the voltage waveforms of the signal lines 3P and 3N are differential voltages with 12 V as the center. As a result, it can be seen that even in a case when there is a potential difference between the grounds of transmission nodes, the ringing suppression circuit 24 operates and suppresses ringing.

According to the fifth embodiment described above, the ringing suppression circuit 24 is configured by connecting the ringing suppression circuits 1 and 12 in parallel between the signal lines 3P and 3N. Therefore, either one of the suppression circuits reliably operates even in a state when there is a difference in the ground potential between each transmission node, and the suppression of ringing can be performed reliably.

(Sixth Embodiment)

Figure 10A:
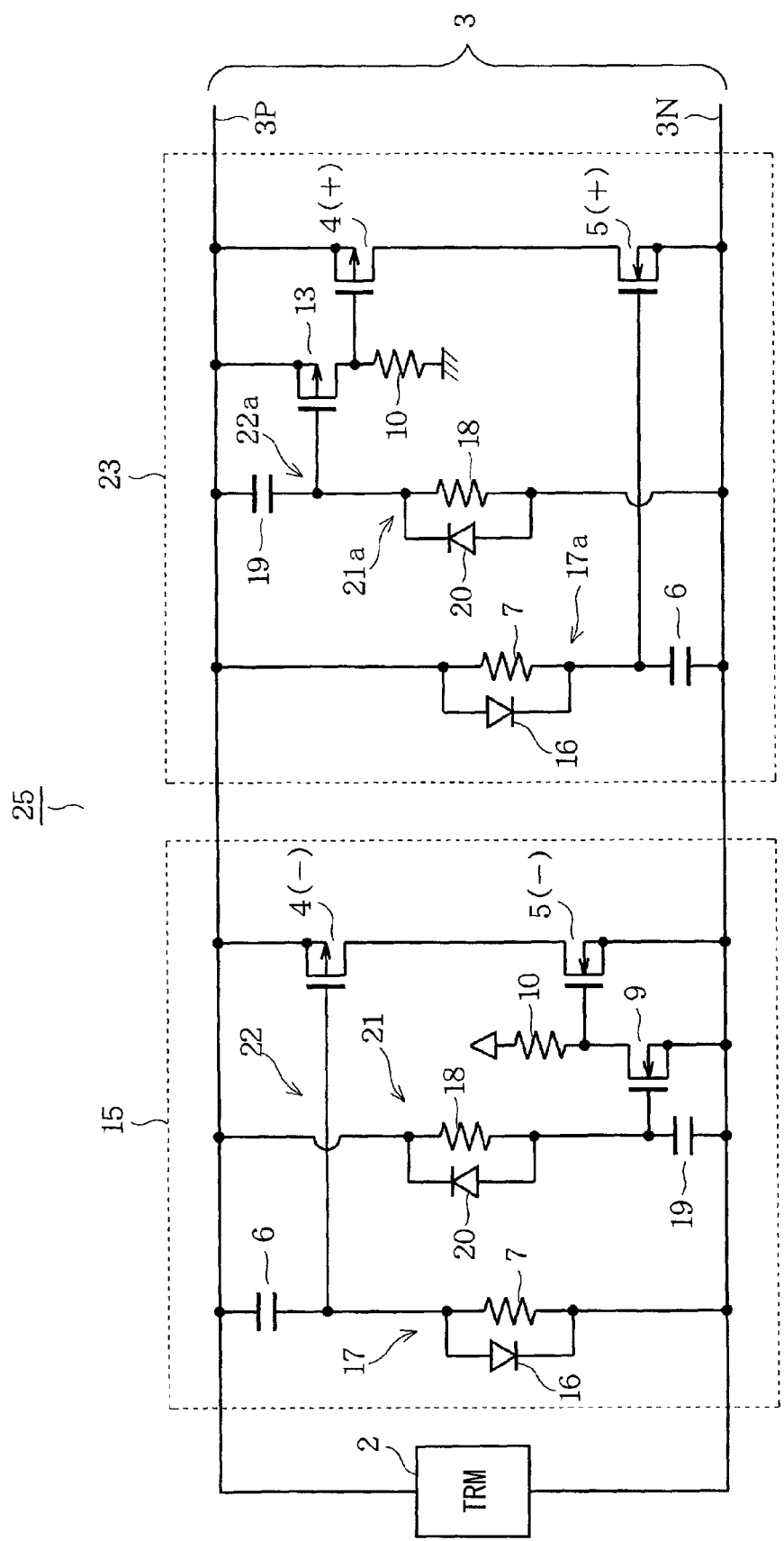
FIGS. 10A and 10B are a circuit diagram according to a sixth embodiment and a time chart of simulation results of the operation of the circuit 10A.
Figure 10B:
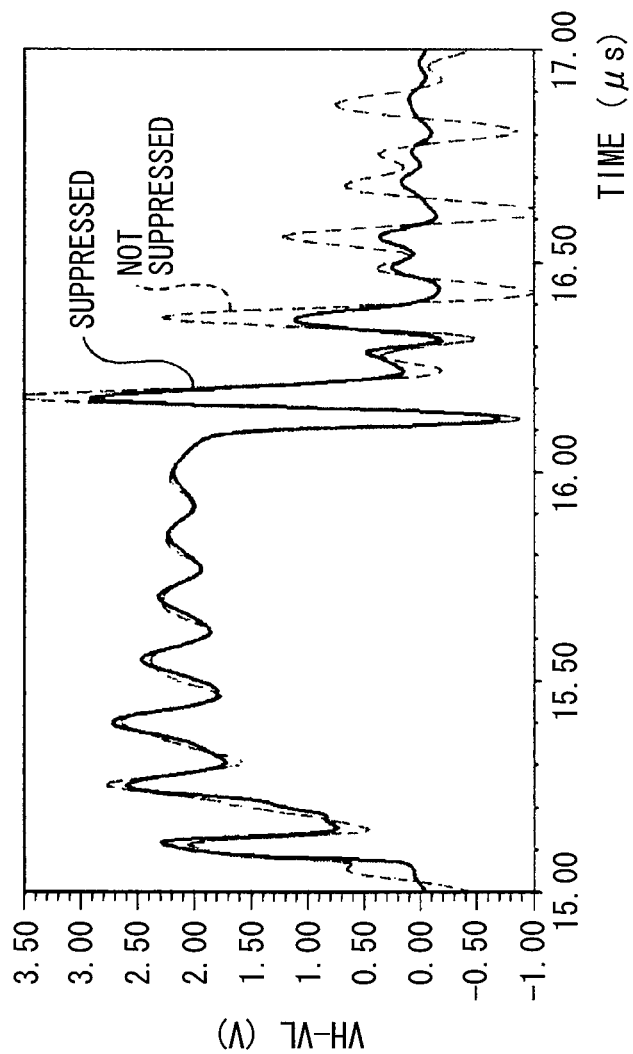
Figure 11:
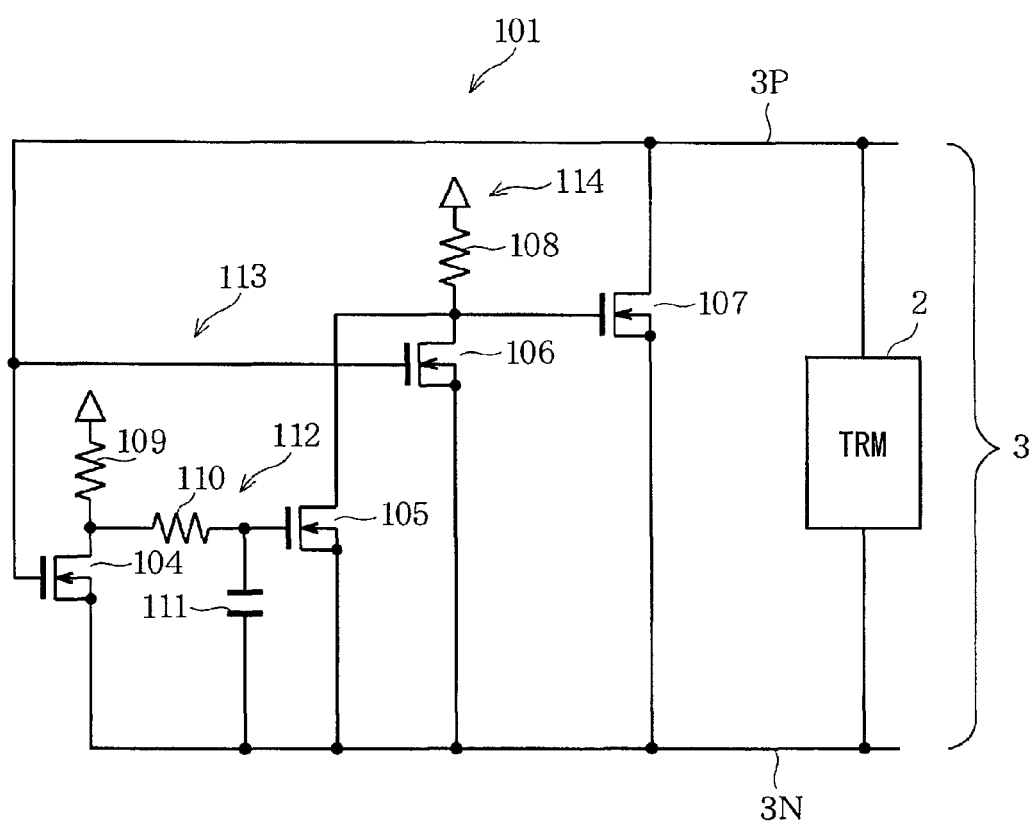
FIG. 11 is circuit diagram of a ringing suppression circuit according to a seventh embodiment.

According to a sixth embodiment shown in FIGS. 10A and 10B, a ringing suppression circuit 25 is configured by connecting the ringing suppression circuit 15 of the third embodiment and the ringing suppression circuit 23 of the fourth embodiment in parallel between the signal lines 3P and 3N. Suppression measures for the overshoot that is generated after the differential signal waveform falls are applied to both of the ringing suppression circuits 15 and 23. The simulation result in a case when there is no ground offset is shown in FIG. 11. If FIG. 7B and FIG. 10B are compared, while the peak value of the overshoot of the former exceeds 3V, the peak value of the latter is less than 3V. Furthermore, as the amplitude of the ringing waveform decreases as a whole and the period of time in which fluctuations converge is also more shortened in the sixth embodiment. Thus, the overall ringing suppression effect is greater in the sixth embodiment.

According to the sixth embodiment described above, since the ringing suppression circuits 15 and 23 are connected in parallel between the signal lines 3P and 3N, a greater ringing suppression effect than the fifth embodiment can be provided.

(Seventh Embodiment)

According to a seventh embodiment shown in FIG. 11, a ringing suppression circuit 101 is connected to the transmission line 3 (3P and 3N) together with the transmission circuit (or may be a receiving circuit) 2 in parallel. The ringing suppression circuit 101 includes four N-channel MOSFETs 104 to 107, in which the sources (potential reference side conductive terminals) are all connected to the low potential side signal line 3N, and the gates (control terminals) of the FETs 104 and 106 are connected to the high potential side signal line 3P. The FETs 106, 105 and 104 form a first, a second and a third switching elements, respectively. The FET 107 is an inter-line switching element, which is also referred to as an output switching element or a 0-th switching element.

The drain (non-reference side conductive terminal) of the FET 107 is connected to the high potential side signal line 3P, and the drains of the FETs 105 and 106 are connected to the gate of the FET 107 as well as being pulled up to the high level (power source level) via a pull-up resistor 108. The drain of the FET 104 (third switching element) is pulled up to the high level via a pull-resistor 109 as well as being connected to the gate of the FET 105 (second switching element) via a resistor 110. Further, the gate of the FET 105 is connected to the low potential side signal line 3N via a capacitor 111.

That is, the resistor 110 and the capacitor 111 configure an RC filter circuit 112. Furthermore, the FETs 104 and 105, the resistor 109, and the RC filter circuit 112 configure a delay circuit 113. The delay circuit 113, the resistor 108 and the FET 106 (first switching element) configure a control circuit (control section) 114.

According to the seventh embodiment described above, as with the CAN that is the on-board LAN, for example, the transmission line 3 transmits the binary signals of the high level and the low level as the differential signal by the transmission line 3. For example, in a case when the power source voltage is 5 V, the high potential side signal line 3P (CAN-H) and the low potential side signal line 3N (CAN-L) are both set to 2.5 V that is an intermediate potential in the non-driven state, the differential voltage VH−VL is 0 V, and the differential signal is at the low level (recessive).

Furthermore, if the transmission circuit 2 drives the transmission line 3, the high potential side signal line 3P is driven at equal to or greater than 3.5 V, for example, the low potential side signal line 3N is driven at equal to or less than 1.5 V, for example. The differential voltage becomes equal to or greater than 2 V, and the differential signal becomes the high level (dominant). Further, although not shown, one end of each of the high potential side signal line 3P and the low potential side signal line 3N are terminated by a resistor with 120Ω. Therefore, when the differential signal level changes from high to low, since the transmission line 3 becomes the non-driven state and the impedance of the transmission line 3 becomes high, ringing is generated on the differential signal waveform.

Figure 12:
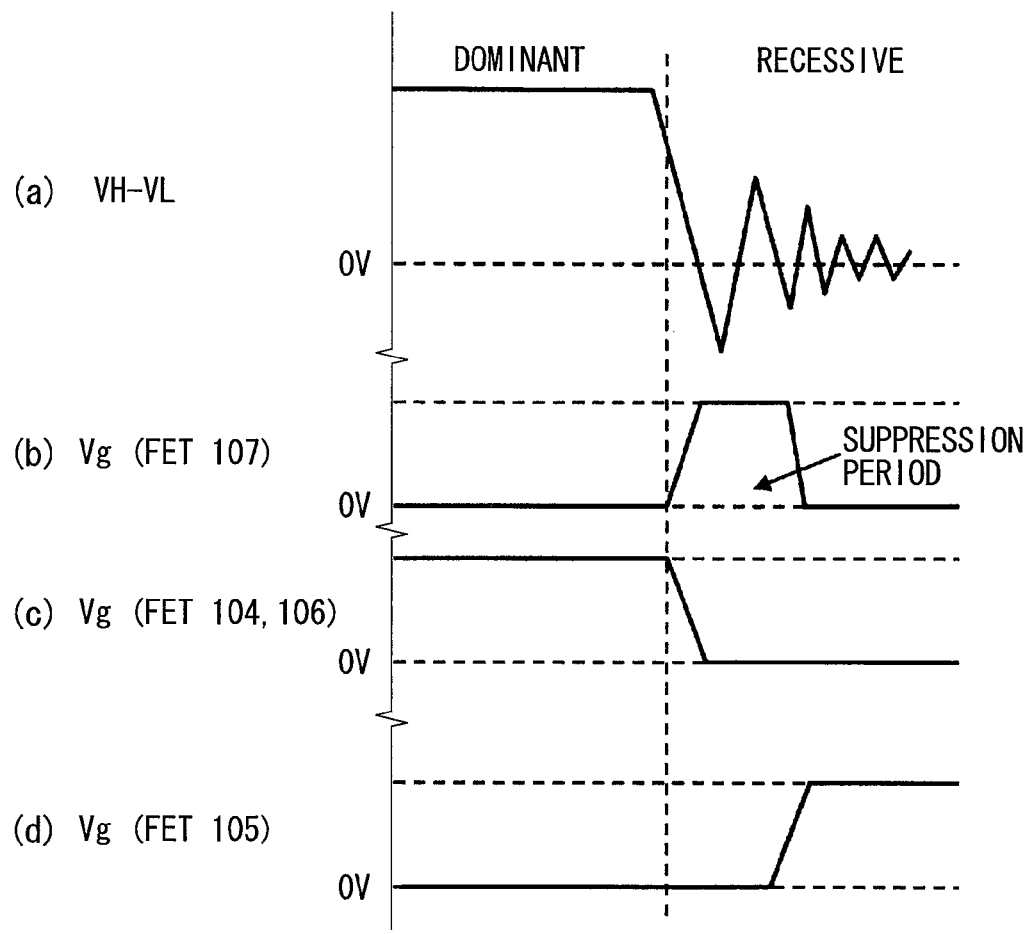
FIG. 12 is a time chart that shows an operation of the ringing suppression circuit shown in FIG. 12.

In FIG. 12, (a) shows the differential signal level changes from high (dominant) to low (recessive) and (b) to (d) show the gate potentials of the FET 107, FETs 104 and 106, and FET 105, respectively. In a case when the differential signal level is high, the FETs 104 and 106 are on as shown by (c) and the FET 105 is off as shown in (d). The FET 107 is therefore in the off-state as shown in (b).

If the differential signal level changes from high to low from such a state as shown in (a), the FETs 104 and 106 are turned off as shown in (c) and the FET 107 is turned on as shown in (b). The high potential side signal line 3P and the low potential side signal line 3N are then connected via the on-resistance of the FET 107, and the impedance decreases. Thus, ringing is suppressed by the energy of the waveform distortion that is generated during the entry period during which the differential signal level changes from high to low, being consumed by the on-resistance.

If the FET 104 is turned off, the capacitor 111 is charged via the resistors 109 and 110. When the terminal voltage of the capacitor 111 rises to exceed the threshold voltage of the FET 105, the FET 105 is turned on as shown in (d). The gate voltage of the FET 107 then becomes the low level as shown in (b), and the FET 107 is turned off. That is, the FET 107 is turned on during a period in which the FETs 104 to 106 are all off (distortion suppression period), and connects the high potential side signal line 3P and the low potential side signal line 3N via the on-resistance thereof.

Here, the operation of the ringing suppression circuit 101 turning on the FET 107 with the differential signal changing from the high level to the low level as a trigger can be seen operate by the following logic. That is, the FET 106 is an inversion circuit that inverts and outputs the differential signal level that is conferred to the gate to the drain, and the FET 105 outputs the falling change of the differential signal to the drain via the FET 104 and the RC filter circuit 112, delaying the change for the fixed period. Furthermore, the FET 107 is turned on by its own gate becoming the high level during a period in which the drain levels of both of the FETs 104 and 106 indicate high, that is, due to the logical product condition of the drain levels of both. Therefore, it is the equivalent of a configuration in which a logical product signal of the output signal of the inversion circuit and the output signal of the delay circuit 113 is output to the gate of the FET 107.

According to the seventh embodiment described above, the FET 107 is connected between the pair of signal lines 3P and 3N. When it is detected that the level of the differential signal that is transmitted via the transmission line 3 has changed from high to low, the control circuit 114 turns on the FET 107 for the fixed period. That is, the generation of ringing can be reliably suppressed by greatly reducing the impedance between the signal lines 3P and 3N during a period when the level of the differential signal transitions by conducting the FET 107 and causing the energy of the distortion of the differential signal waveform to be absorbed.

Furthermore, the control circuit 114 is configured to include an inversion circuit (FET 106) that inverts and outputs the level of the differential signal, and the delay circuit 113 that delays the level of the differential signal for the fixed period and outputs the level of the differential signal. In addition, the FET 107 is turned on by a logical product signal of the signal that is output from the inversion circuit and the signal that is output from the delay circuit 113. Further, the delay circuit 113 is configured to include the FETs 104 and 105 and the RC filter circuit 112. The drain of the FET 105 is connected to the gate of the FET 107. The drains of the RC filter 112 and the FET 104 are connected to the signal line 3N.

Thus, a delay of the fixed period can be conferred by changing the charging state of the capacitor 111 that configures the RC filter 112 via the FET 104 with the change in the level of the differential signal as the trigger and changing the switching state of the FET 105 according to the change in the charging state, that is, according to the time constant of the RC filter circuit 112. Therefore, since the output of the FET 106 and the output signal of the delay circuit 113 have the same logic during the fixed period that is conferred as the delay time by the RC filter circuit 112, ringing can be suppressed by turning on the FET 107 by the logical product circuit thereof.

(Eighth Embodiment)

Figure 13:
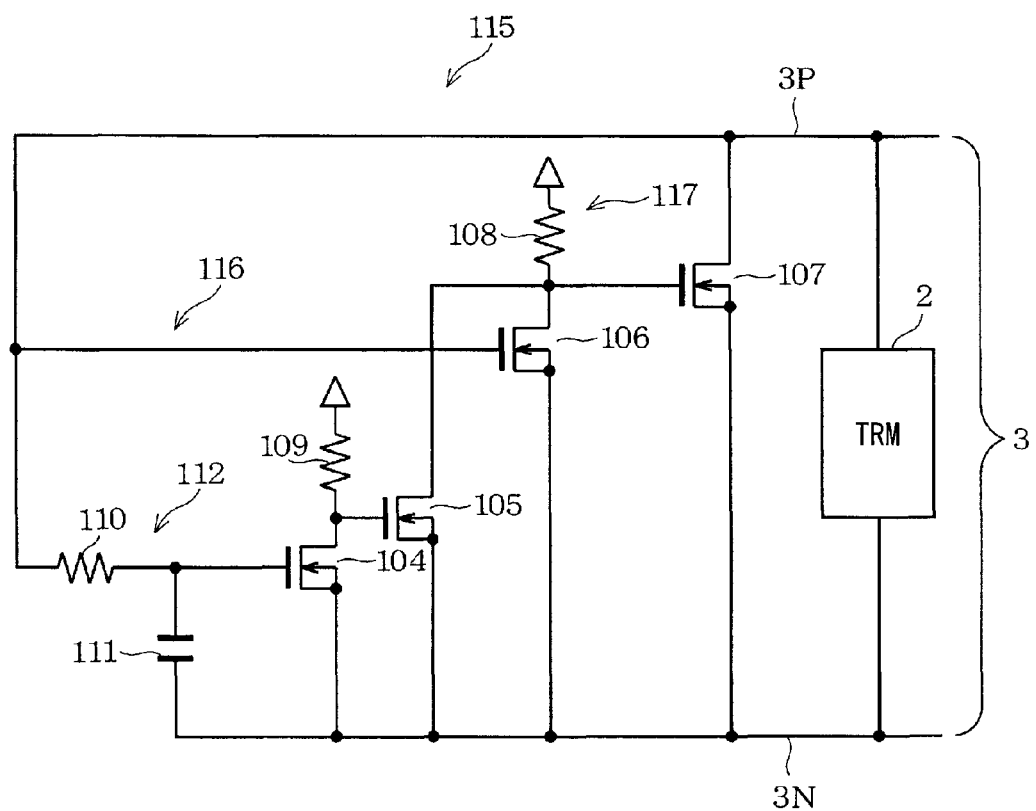
FIG. 13 is a circuit diagram of a ringing suppression circuit according to an eighth embodiment.

According to an eighth embodiment shown in FIG. 13, a ringing suppression circuit 115 has different configuration from the ringing suppression circuit 101 of the seventh embodiment in that the connection order of the FET 104 and the RC filter circuit 112 is switched. That is, one end of the resistor 110 which is the input terminal of the RC filter circuit 112 is connected to the high potential side signal line 3P, and the other end of the resistor 110 which is the output terminal of the RC filter circuit 112 is connected to the gate of the FET 104. Furthermore, the drain of the FET 104 is connected to the gate of the FET 105. Here, the FET 104 and the RC filter circuit 112 configures a delay circuit 116, and the FET 106 and the resistor 108 are added to the delay circuit 116 to configure a control circuit (control section) 117.

Figure 14:
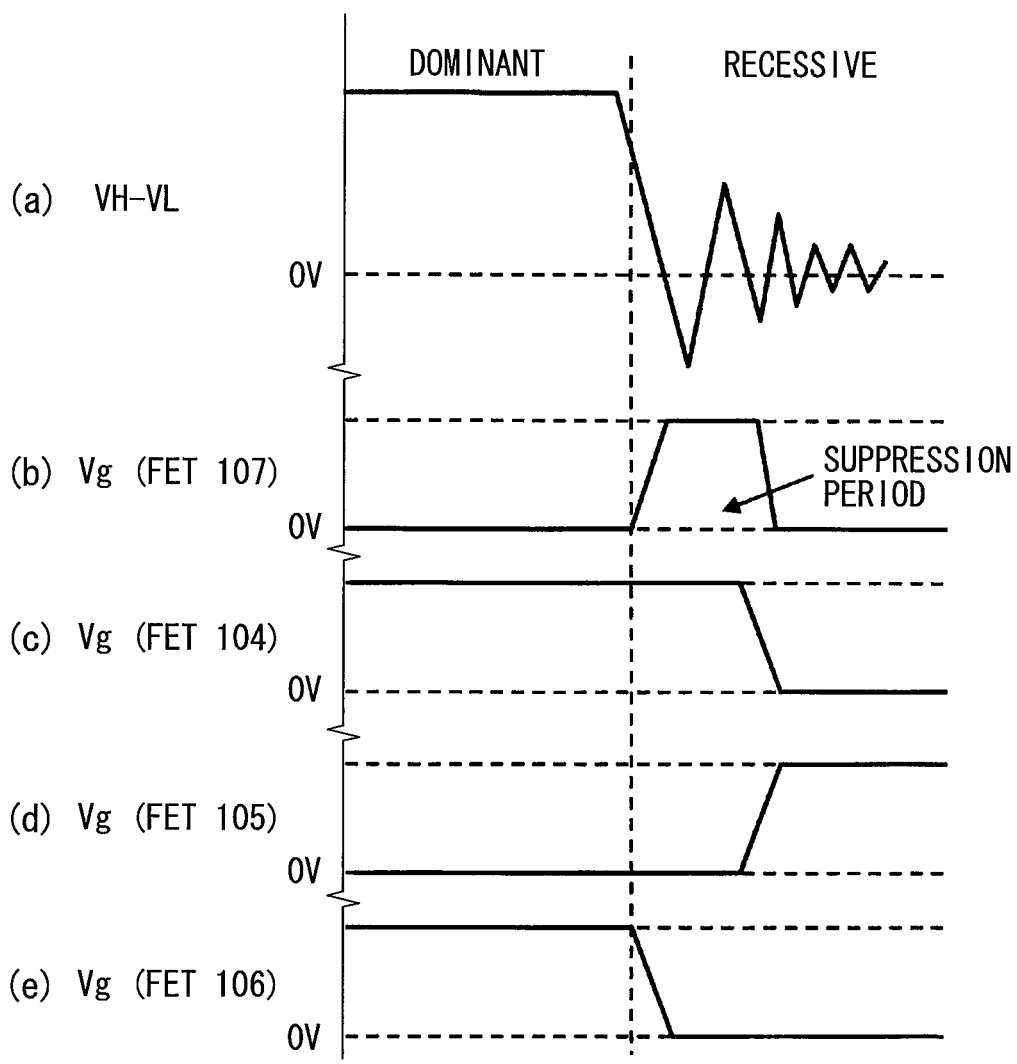
FIG. 14 is a time diagram that shows an operation of the ringing suppression circuit shown in FIG. 13.

In FIG. 14, which corresponds to FIG. 12, (a) shows the differential signal level changes from high to low. In this case, only the FET 106 turns off initially as shown in (e). Since the FET 105 maintains the off-state at such a time as shown in (d), the FET 107 is turned on as shown in (b). Furthermore, a delay time is conferred while the capacitor 111 of the RC filter circuit 112 which was charged in a state in which the differential signal level was high is discharged. When the gate of the FET 104 becomes the low level as shown in (c), the FET 104 is turned off. Since the FET 105 is then turned on as shown in (d), the gate voltage of the FET 107 becomes the low level as shown in (b), and the FET 107 is turned off. The result is the same operation as the seventh embodiment.

Further, the ringing suppression circuit 115 of the eighth embodiment operates as below. In the case of the ringing suppression circuit 101 of the seventh embodiment, the power source voltage that is conferred on the input terminal of the RC filter circuit 12 via the resistor 109 is set to 5 V or the like with the ground level G1 of the ringing suppression circuit 101 as the reference. On the other hand, the high and low levels of the differential signal that is transmitted via the transmission line 3 are determined according to the ground level G2 of a transmission node that drives the transmission line 3. Furthermore, in the case of a configuration in which a communication node is arranged at each portion of a vehicle as with the transmission line 3 of an on-board LAN, it is assumed that the potential of the ground that is connected to each communication node is different (ground offset).

For example, if the size relationship of both ground levels G1 and G2 is G1>G2, the low level of the low potential side signal line 3N in a case when the differential signal is dominant becomes lower than the assumed level (for example, in a case when the 1.5 V that is assumed as described above is a lower level), and the potential difference between the power source and the low level becomes large. Since the amount of time during which the capacitor 111 of the RC filter circuit 112 charges becomes short, the suppression effect of ringing may not be sufficiently provided as the delay time that is conferred by the RC filter circuit 112 becomes shorter and the period during which the FET 107 is turned on becomes short.

On the other hand, with the ringing suppression circuit 115 of the eighth embodiment, since the RC filter circuit 112 is directly connected between the high potential side signal line 3P and the low potential side signal line 3N, the differential voltage in a case when the differential signal is dominant remains constant regardless of the size relationship of the ground levels G1 and G2. Therefore, as the delay time that is conferred by the RC filter circuit 112 is constant, the period during which the FET 107 is on is also constant, and the suppression effect of ringing is reliably provided.

According to the eighth embodiment described above, the RC filter circuit 112 that configures the delay circuit 116 is connected between the high potential side signal line 3P and the FET 105. With such a configuration, the charging state of the capacitor 111 that configures the RC filter circuit 112 changes with the change in the level of the differential signal from high to low as the trigger. Furthermore, the delay of the fixed period can be conferred by changing the switching state of the FETs 105 and 106 according to the change in the charging state. Therefore, even if there is a ground potential difference between communication nodes or between the communication node and the ringing suppression circuit 115, the charging and discharging time of the capacitor 111 is determined by the potential difference of the differential signal and the time during which the FET 107 is conductive is constant. The influence of the ground potential difference is removed, and the suppression of ringing can be performed reliably.

(Ninth Embodiment)

According to a ninth embodiment shown in FIG. 15, a ringing suppression circuit 118 differs from the ringing suppression circuit 115 of the eighth embodiment in the following points. A series circuit of a resistor 119 and a capacitor 120 is connected between the high potential side signal line 3P and the low potential side signal line 3N, and a common connection point of both is connected to the gate of the FET 106. Further, a diode 121 is connected in parallel with respect to the resistor 119 so that the anode is on the gate side. Such portions configure a delay circuit 122. Furthermore, the delay circuit 122 is added to the control circuit 117 of the eighth embodiment to configure a control circuit (control section) 123.

In the ringing suppression circuit 115 of the eighth embodiment, if an overshoot occurs after the signal waveform has fallen when the differential signal level changes from high to low, the FET 106 turns on and the FET 107 turns off. It is assumed that the ringing suppression effect is reduced. Therefore, instead of connecting the gate of the FET 106 directly to the high potential side signal line 3P, the gate of the FET 106 is connected to the delay circuit 122.

That is, due to the operation of the delay circuit 122, in a case when the level changes from low to high as with an overshoot that is generated after the differential signal falls, the charging to the capacitor 120 is performed via the resistor 119 and the FET 107 is not easily turned off. On the other hand, in a case when the differential signal changes from high to low, the charge of the capacitor 120 is immediately discharged via the diode 121 and there is no effect on the turning on of the FET 107.

According to the ninth embodiment described above, the delay circuit 122 is configured by connecting a series circuit of the resistor 119 and the capacitor 120 that are connected between the signal lines 3P and 3N and connecting the diode 121 in parallel to the resistor 119, and the common connection point of the resistor 119 and the capacitor 120 is connected to the gate of the FET 106. Therefore, in a case when an overshoot is generated after the differential signal waveform has fallen, the FET 106 is suppressed from being turned on in compliance with the overshoot, and the FET 107 can be prevented from being temporarily turned off. Further, in a case when the differential signal level is changed from high to low by the diode 121 that is connected to the resistor 119 in parallel, the charge of the capacitor 120 can be rapidly discharged via the diode 121. In a case when the differential signal waveform has fallen, the FET 106 can be turned off immediately.

(Tenth Embodiment)

Figure 16:
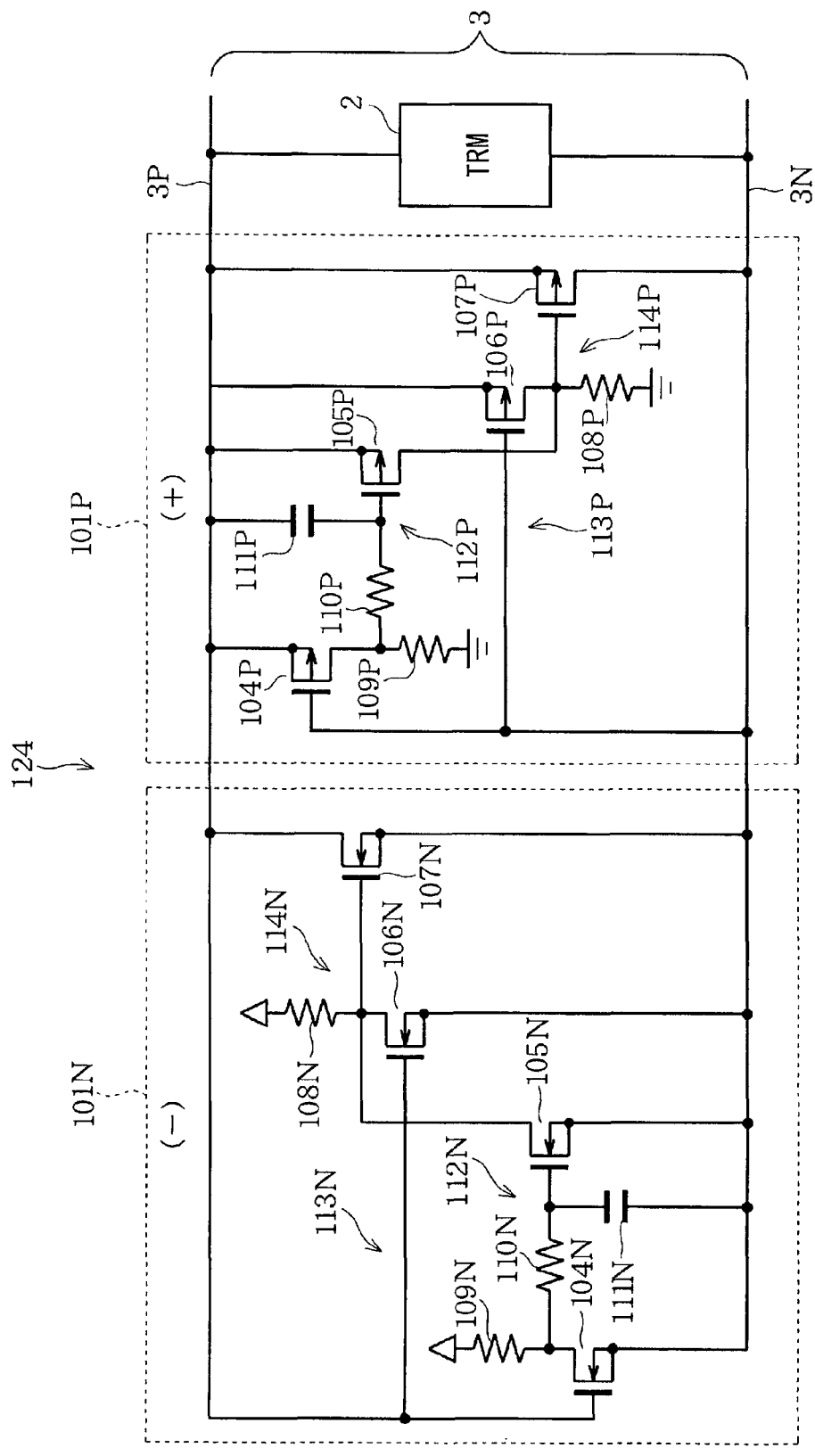
FIG. 16 is a circuit diagram of a ringing suppression circuit according to a tenth embodiment.

According to a tenth embodiment shown in FIG. 16, a ringing suppression circuit 124 is formed two ringing suppression circuits 101N and 101P. As the ringing suppression circuit 101N (first suppression circuit), the ringing suppression circuit 101 of the seventh embodiment is connected to the transmission line 3. The ringing suppression circuit 101P (second suppression circuit) is connected in parallel to the ringing suppression circuit 101N and configured to be symmetrical with the ringing suppression circuit 101N by using P-channel MOSFETs 104P to 107P.

The ringing suppression circuit 101P will be described below by adding "P" to the symbol of constituent elements that correspond to the ringing suppression circuit 101N. The ringing suppression circuit 101P includes four P-channel MOSFETs 104P to 107P in which the sources are all connected to the high potential side signal line 3P, and the gates (control terminals) of the FETs 104P and 106P are connected to the low potential side signal line 3N.

The drain of the FET 107P is connected to the low potential side signal line 3N, and the drains of the FETs 104P and 106P are connected to the gate of the FET 107 as well as being pulled down to the low level (ground level) via a pull-down resistor 108P. The drain of the FET 104P is pulled down to the low level via a pull-down resistor 109P, as well as being connected to the gate of the FET 105P via a resistor 110P. Further, the gate is connected to the high potential side signal line 3P via a capacitor 111P. That is, the resistor 110P and the capacitor 111P configure an RC filter circuit 112P.

The operation of the ringing suppression circuit 101P is the same as the ringing suppression circuit 101N. That is, in a case when the differential signal level is high, since the FETs 104P and 106P are on, the FET 105P is off and the FET 107P is in the off-state. Furthermore, since the FETs 104P and 106P are turned off when the differential signal level changes from high to low, the FET 107P is turned on. Ringing is thus suppressed by the high potential side signal line 3P and the low potential side signal line 3N being connected via the on-resistance of the FET 107P and the impedance decreasing, and the energy of the waveform distortion being consumed by the on-resistance.

If the FET 104P is turned off, the capacitor 111P is charged by a path via the resistors 109P and 110P. If the terminal voltage of the capacitor 111P rises above a threshold voltage of the FET 105P, the FET 105P is turned on. The gate voltage then becomes the low level and the FET 107P is turned off.

Furthermore, by connecting the ringing suppression circuits 101N and 101P to the transmission line 3 in parallel, the following advantages are provided. In a case when only the ringing suppression circuit 101N is connected, as described in the eighth embodiment, there is a potential difference between the ground levels G1 and G2. If G1<G2, with the ringing suppression circuit 101N, the voltage between the gate and the source of the FETs 104N to 107N becomes smaller. It is thus difficult to reliably turn on the FETs 104N to 107N. However, if such a state is considered with regard to the ringing suppression circuit 101P, since the voltage between the gate and the source of the FETs 104P to 107P becomes greater, the FETs 104P to 107P are reliably turned on. Further, if the size relationship between the ground levels G1 and G2 is G1>G2, the above relationship is reversed, making the operations of the ringing suppression circuits 101N and 101P difficult.

Therefore, by connecting the ringing suppression circuits 101N and 101P in parallel, even in a case when there is a ground offset between the communication nodes, at least one of ringing suppression circuits 151N and 151P reliably operates.

Figure 17A:
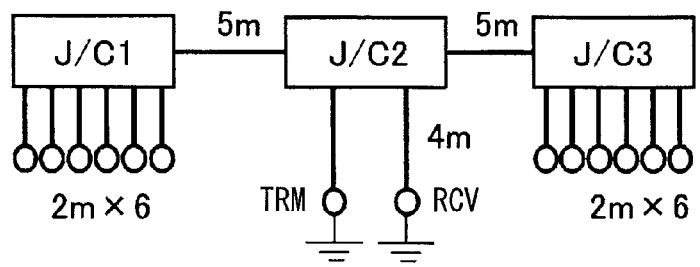
FIGS. 17A to 17C are a circuit diagram and time charts that illustrate the simulation results of an operation of the circuit of FIG. 17A.

A simulation is conducted by using a network model shown in FIG. 17A. Three connection point connectors J/C1, J/C2 and J/C3 are connected by a 5 m transmission line, and six communication nodes are respectively all connected to the connection point connectors J/C1 and J/C3 via 2 m transmission lines. Furthermore, a transmission node and a receiving node are respectively connected to the connection point connector J/C2 via 4 m transmission lines, and the ringing suppression circuit 124 is connected to the transmission line on the receiving node side.

Figure 17B:
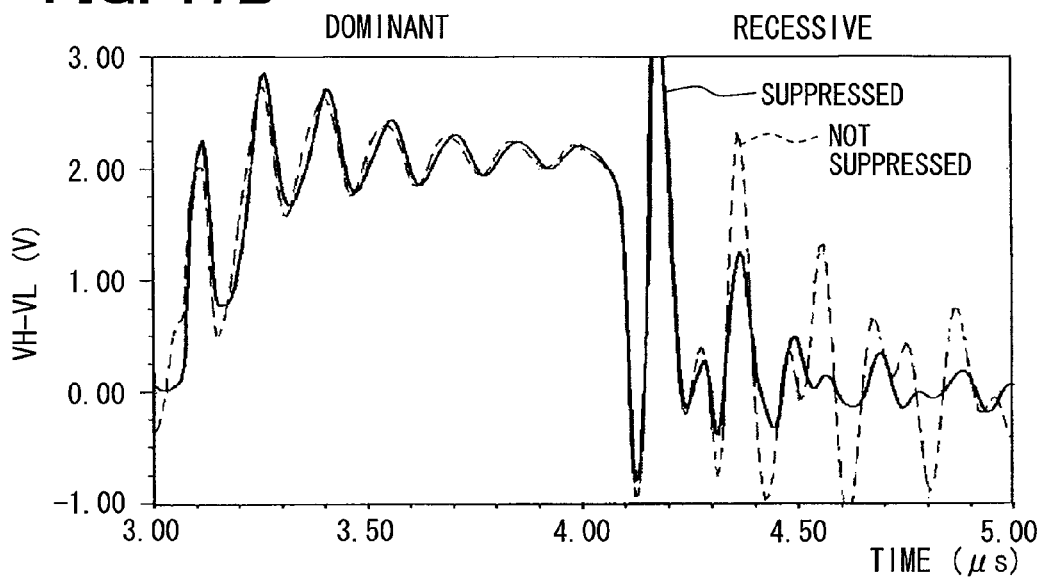
Figure 17C:
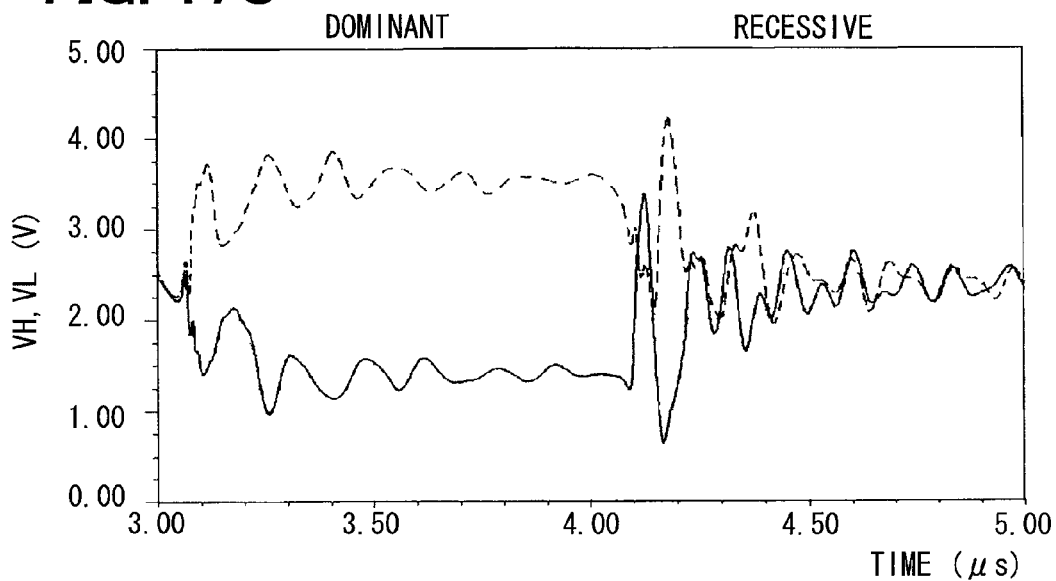

FIGS. 17B and 17C show the results of simulating the operations of the ringing suppression circuit 124 in a case when there is no offset to the ground levels of the transmission node and the receiving node. In the result shown in FIG. 17B, a solid line indicates a case where the ringing suppression circuit 124 is connected and the distortion is suppressed, and a dotted line indicates a case when the ringing suppression circuit 124 is not connected and the distortion is not suppressed. FIG. 17B shows the voltage waveform in a case when the differential signal changes from dominant to recessive, and FIG. 17C show the respective voltage waveforms of the signal lines CAN-H and CAN-L at such a time. As shown in FIG. 17B, it can be seen that the oscillations in the voltage waveform converge more quickly after switching to recessive when the distortion is suppressed.

According to the tenth embodiment described above, the ringing suppression circuit 101N in which each switching element is configured by the FETs 104N to 107N and the ringing suppression circuit 101P in which each switching element is configured by the FETs 104P to 107P are connected in parallel between the signal lines 3P and 3N. Even in a state in which there is a difference in the ground potential between the communication nodes, at least one of the ringing suppression circuits 101N and 101P reliably operates, and suppression of ringing can be performed reliably. The simulation relating to such an operation will be described in the following embodiment.

(Eleventh Embodiment)

Figure 18:
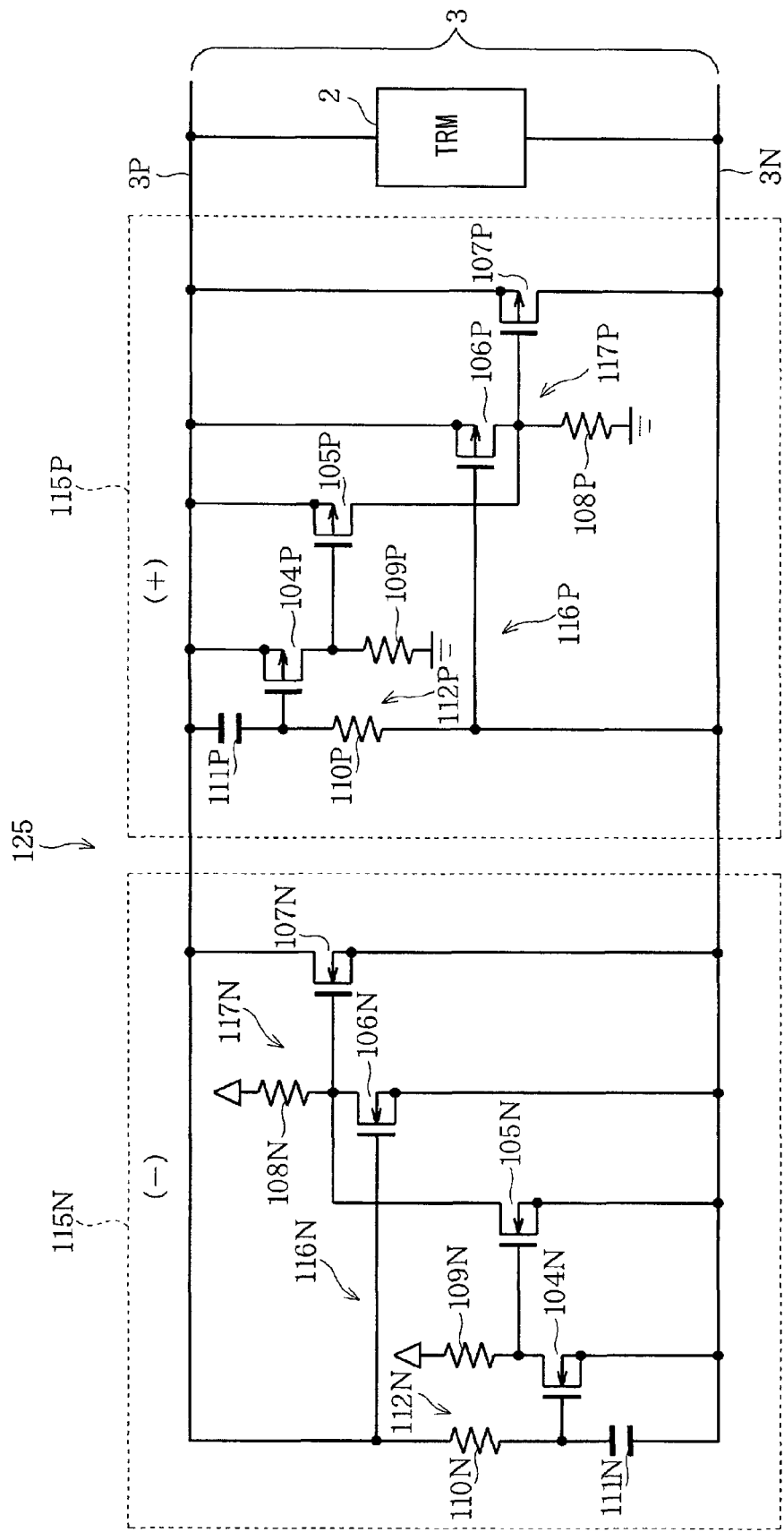
FIG. 18 is a circuit diagram of a ringing suppression circuit according to an eleventh embodiment.

In an eleventh embodiment shown in FIG. 18, a ringing suppression circuit 125 is formed of a ringing suppression circuit 115N (first suppression circuit) and a ringing suppression circuit 115P (second suppression circuit). The ringing suppression circuit 115N is the same as the ringing suppression circuit 115 of the eighth embodiment (FIG. 13). The ringing suppression circuit 115N is connected to the transmission line 3 in parallel with the ringing suppression circuit 115P. The ringing suppression circuit 115P is configured to be symmetrical using P-channel MOSFETs 104P to 107P.

FIGS. 19A and 19B show the simulation results of the ringing suppression circuit 125 of FIG. 18 in a case when there is no ground offset. FIGS. 20A and 20B show the simulation results of the ringing suppression circuit 125 of FIG. 18 in a case when the ground offset is −7.5 V. FIGS. 21A and 21B show the simulation results of the ringing suppression circuit 125 of FIG. 18 in a case when the ground offset is +9.5 V. Therefore, the intermediate potential in the recessive state is −5 V in FIG. 20B, and the intermediate potential is 12 V in FIG. 21B. Furthermore, as shown in FIGS. 19A to 21A, it can be seen that fluctuations in the ringing waveform can be suppressed by connecting the ringing suppression circuit 125, regardless of the existence of a ground offset.

(Twelfth Embodiment)

Figure 22:
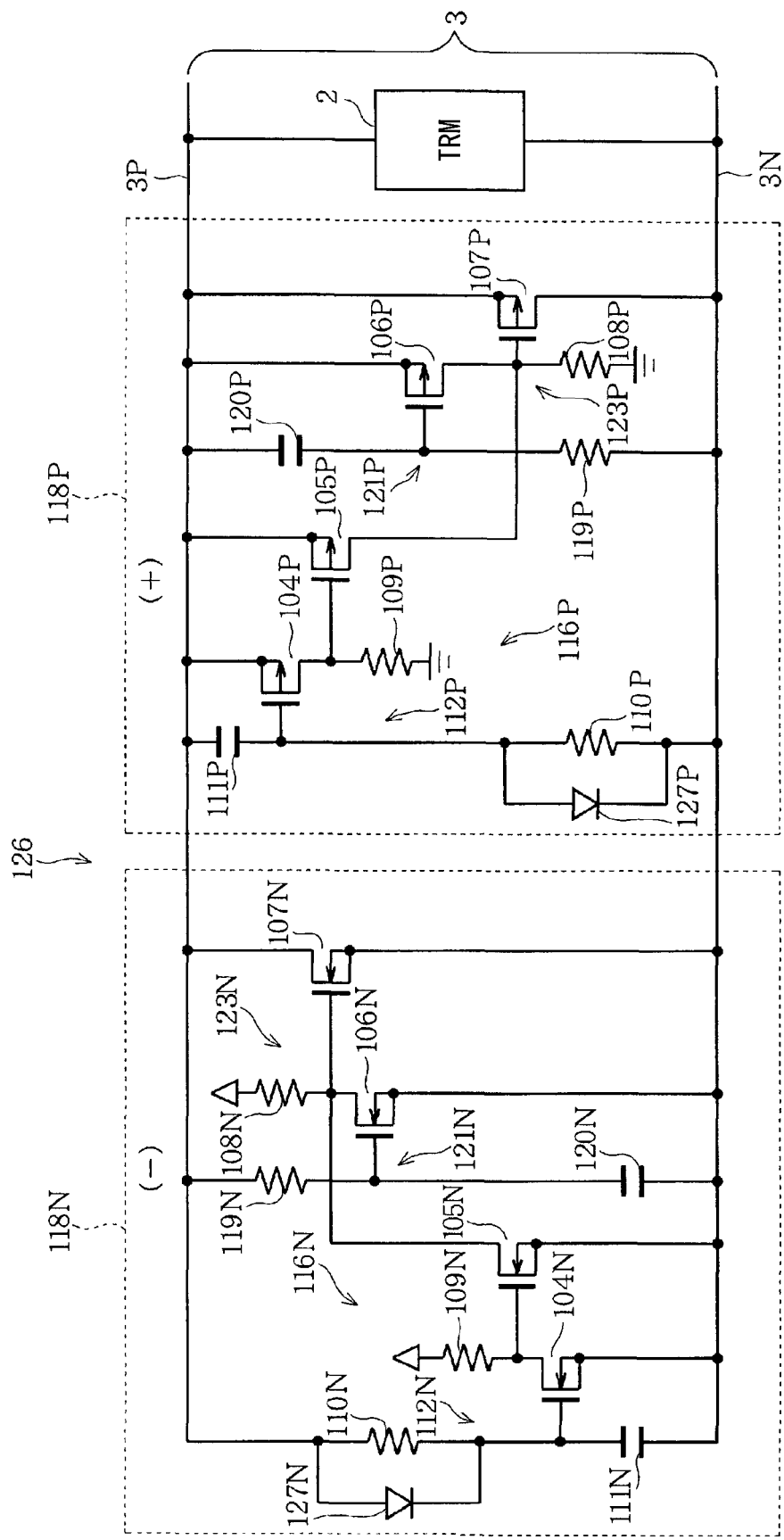
FIG. 22 is a circuit diagram of a ringing suppression circuit according to a twelfth embodiment.

In a twelfth embodiment shown in FIG. 22, a ringing suppression circuit 126 is formed of a ringing suppression circuit 118N (first suppression circuit) and a ringing suppression circuit 118P (second suppression circuit). The ringing suppression circuit 118N is the same as the ringing suppression circuit 118 of the ninth embodiment and connected to the transmission line 3 in parallel with the ringing suppression circuit 118P that is configured to be symmetrical using P-channel MOSFETs 104P to 107P. However, the diode 121 is not connected, and alternatively a diode 127 is connected to both ends of the resistor 110. The anode of a diode 127N is connected to the high potential side signal line 3P, and the anode of a diode 127P is connected to the gate of the FET 104P.

Furthermore, FIGS. 23A and 23B show the simulation results of the ringing suppression circuit 126 in a case when there is no ground offset. FIGS. 24A and 24B show the simulation result in a case when the ground offset is −7.5 V. FIGS. 25A and 25B show the simulation results in a case when the ground offset is +9.5 V. Therefore, the intermediate potential in the recessive state is −5 V in FIG. 24B, and the intermediate potential is 12 V in FIG. 25B. Furthermore, as shown in FIGS. 23A to 25A, it can be seen that fluctuations in the ringing waveform can be suppressed by connecting the ringing suppression circuit 126, regardless of the existence of a ground offset.

(Thirteenth Embodiment)

Figure 26:
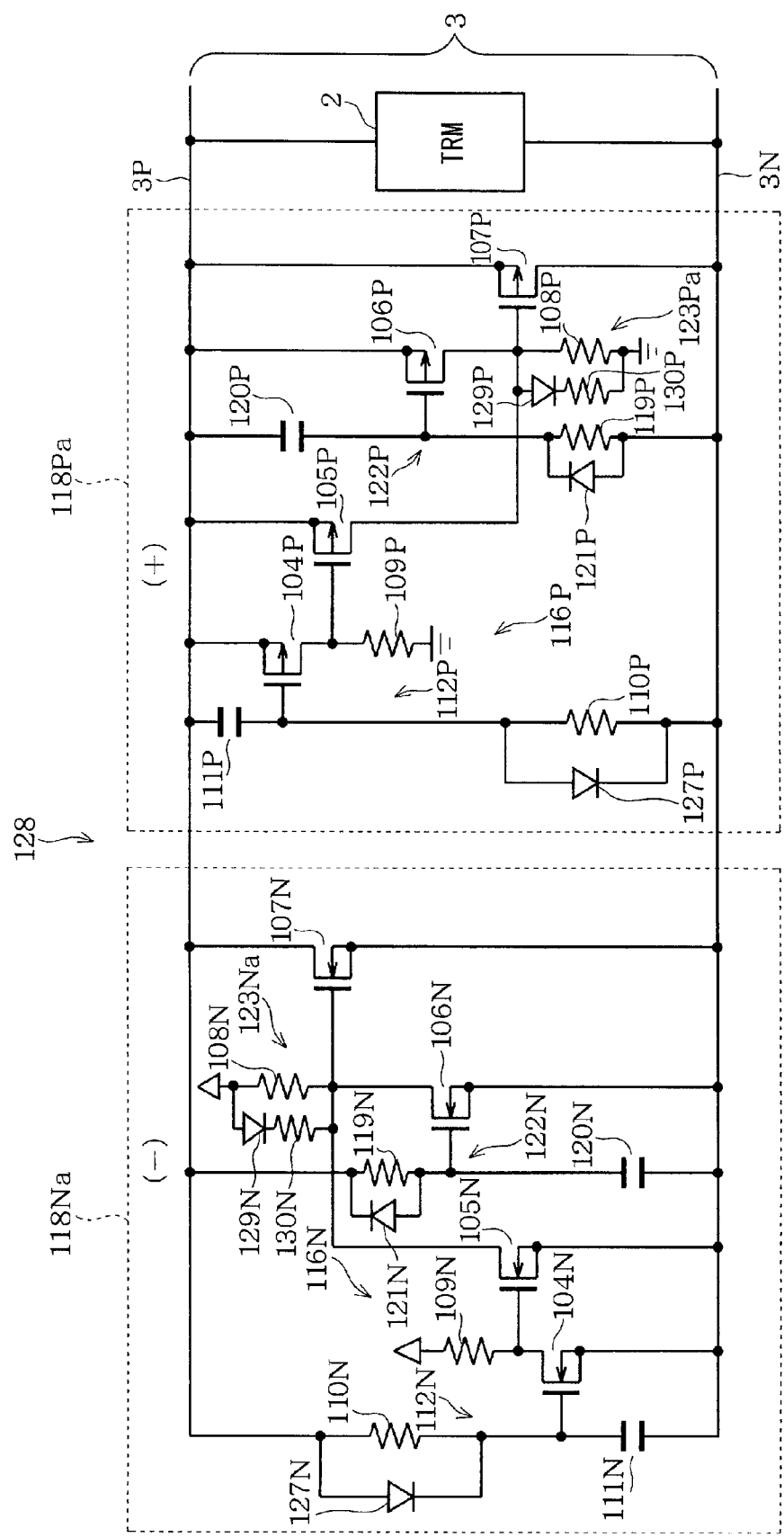
FIG. 26 is a circuit diagram of a ringing suppression circuit according to a thirteenth embodiment.

In a thirteenth embodiment shown in FIG. 26, a ringing suppression circuit 128 is formed of two ringing suppression circuits 118Na and 118Pa, which are similar to the ringing suppression circuits 118N and 118P of the twelfth embodiment (FIG. 22). In each ringing suppression circuit, a diode 121 is connected in parallel to the resistor 119. Further a series circuit of a diode 129 and a resistor 130 is connected in parallel to the resistor 108. A diode 129N is connected such that its anode is on the high potential signal line 3P side. A diode 129P is connected such that its cathode is on the low potential signal line 3N side. The resistance of the resistor 130N is set to be smaller than that of the pull-up resistor 108N. The resistance of the resistor 130P is set to be smaller than that of the pull-down resistor 108P.

Figure 27:
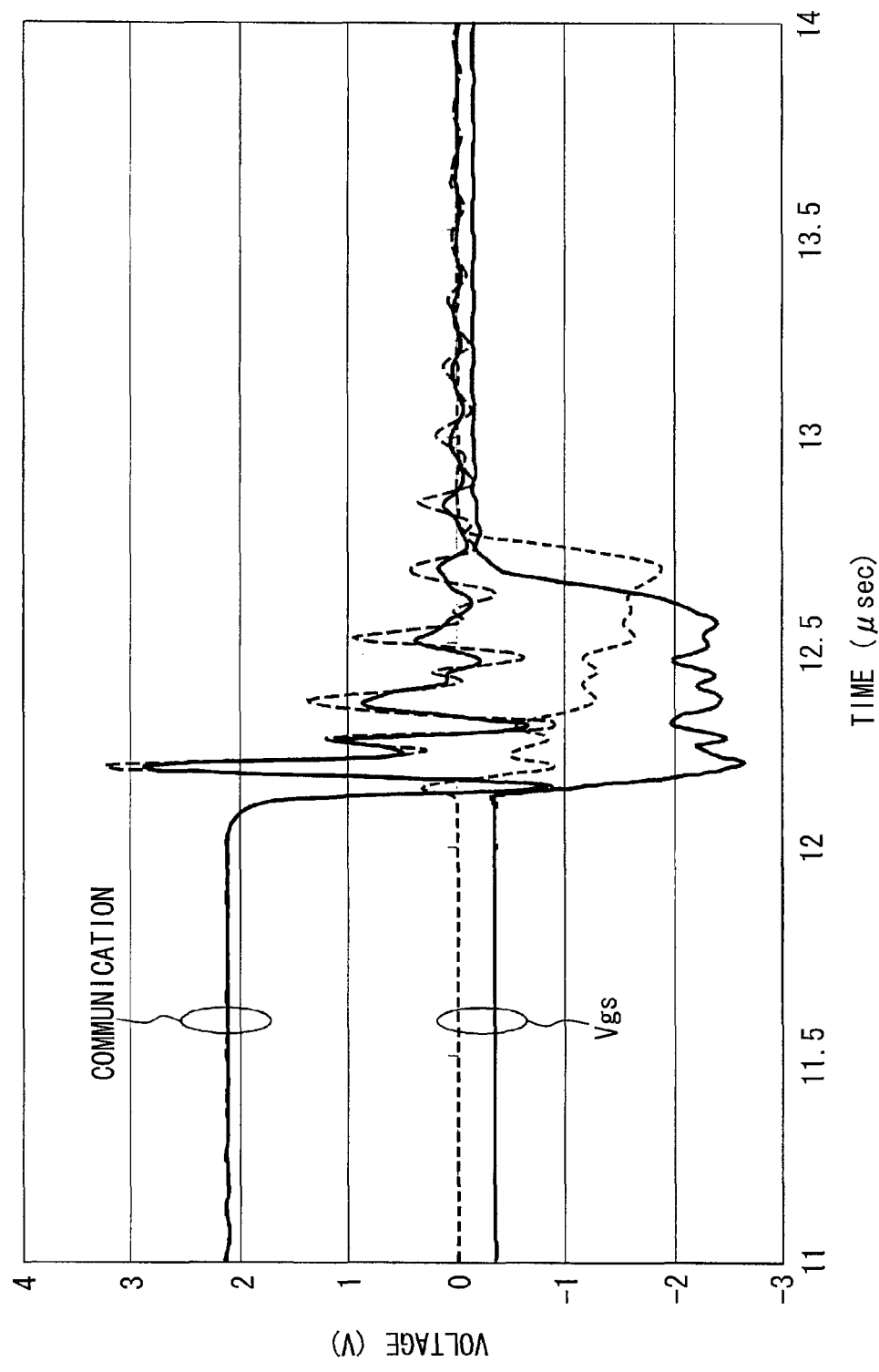
FIG. 27 is a time chart that illustrates the simulation result of an operation of the circuit of FIG. 26.

The thirteenth embodiment operates as shown in FIG. 27, which illustrates the simulation result of a circuit operation of the ringing suppression circuit 118Pa. In FIG. 27, the voltage 0 V in the axis of ordinate indicates 0 V of a communication voltage (differential voltage) of the transmission line 3. The gate voltage of the FET 107P is shown by shifting the reference voltage for convenience of illustration. The solid line indicates a voltage variation in case that the series circuit of the diode 129P and the resistor 130P is provided as shown in FIG. 26. The dotted line indicates a voltage variation in a case where such a series circuit is not provided.

By connecting the series circuit of the diode 129P and the resistor 130P in parallel to the pull-down resistor 108P, the resistance of a path allowing a discharge current to flow from the gate to the ground is more reduced when the gate voltage Vgs of the FET 107P changes from the high level to the low level. Thus, the gate voltage Vgs falls more sharply than in the case of no provision of the series circuit and hence the FET 107P (last-stage or output FET) turns off more quickly.

The series circuit of the diode 129N and the resistor 130N is connected in parallel to the pull-up resistor 108N for the FET 107N. The resistance of a path allowing a charge current to flow from the power source Vcc to the gate is more reduced when the gate voltage Vgs of the FET 107N changes from the low level to the high level. The gate voltage Vgs rises more sharply than in the case of no provision of the series circuit and hence the FET 107N turns on more quickly.

According to the thirteenth embodiment described above, the FETs 107N and 107P can be turned on more quickly thereby to suppress the ringing more effectively.

(Fourteenth Embodiment)

Figure 28:
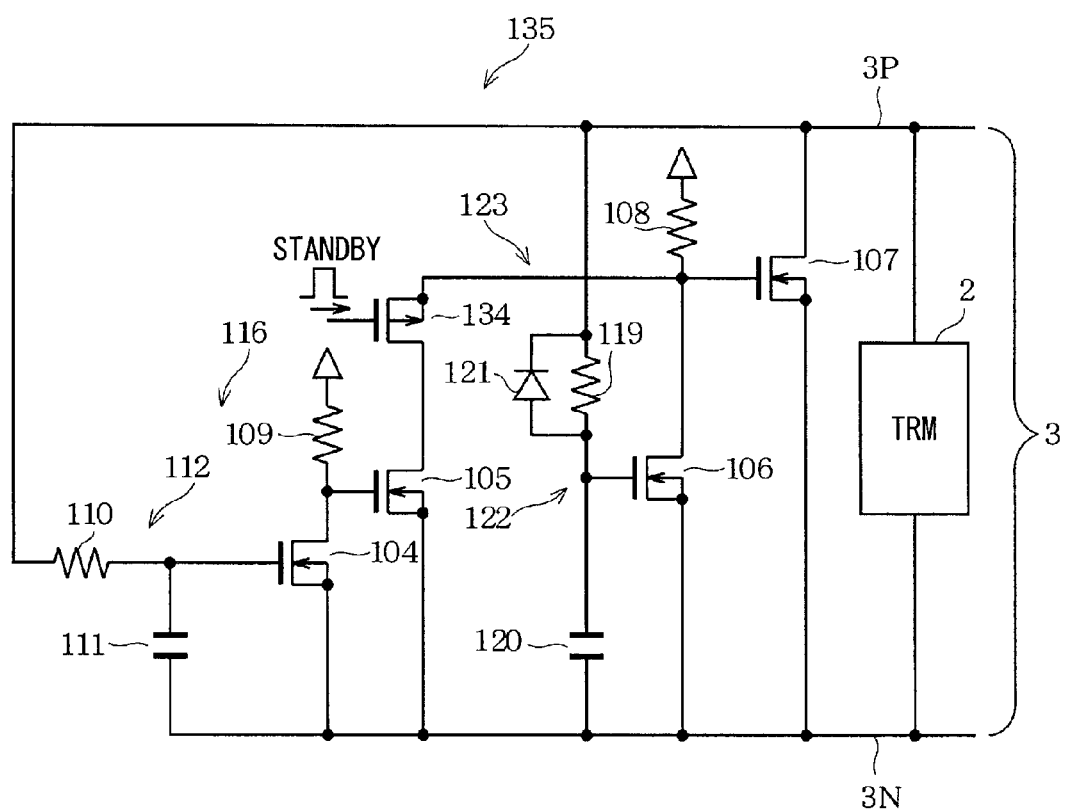
FIG. 28 is a circuit diagram of a ringing suppression circuit according to a fourteenth embodiment.
Figure 29:
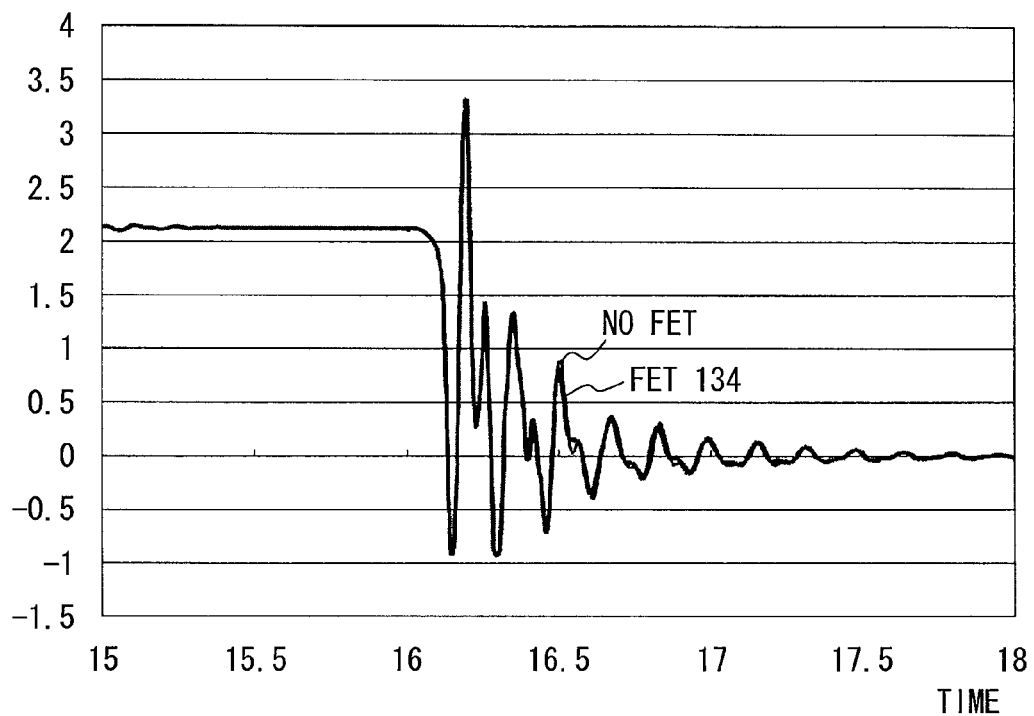
FIG. 29 is a time chart that illustrates the simulation result of an operation of the circuit shown in FIG. 29.
Figure 30:
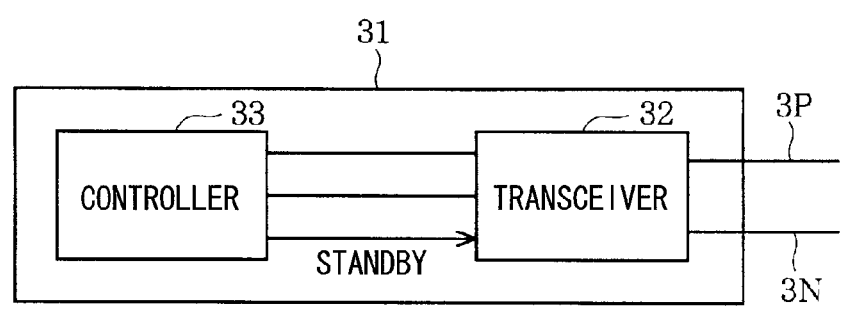
FIG. 30 is a block diagram showing schematically a communication node.

In a fourteenth embodiment shown in FIGS. 28 to 30, each communication node 31 connected to the transmission line 3 is formed of a transceiver IC 32 and a controller IC (controller circuit) 33 as shown in FIG. 30. The transceiver IC 32 is formed of a transmitter circuit and a receiver circuit. The controller IC 33 controls communication as a shut-off element control section and controller section. The controller IC 33 includes a microcomputer and associated circuits and has a function of reducing power consumption by taking a standby mode in an idle state, in which no communication is required. When the controller IC 33 changes its mode to the standby mode, a standby signal of a high level (active) is outputted to the transceiver IC 32.

Figure 15:
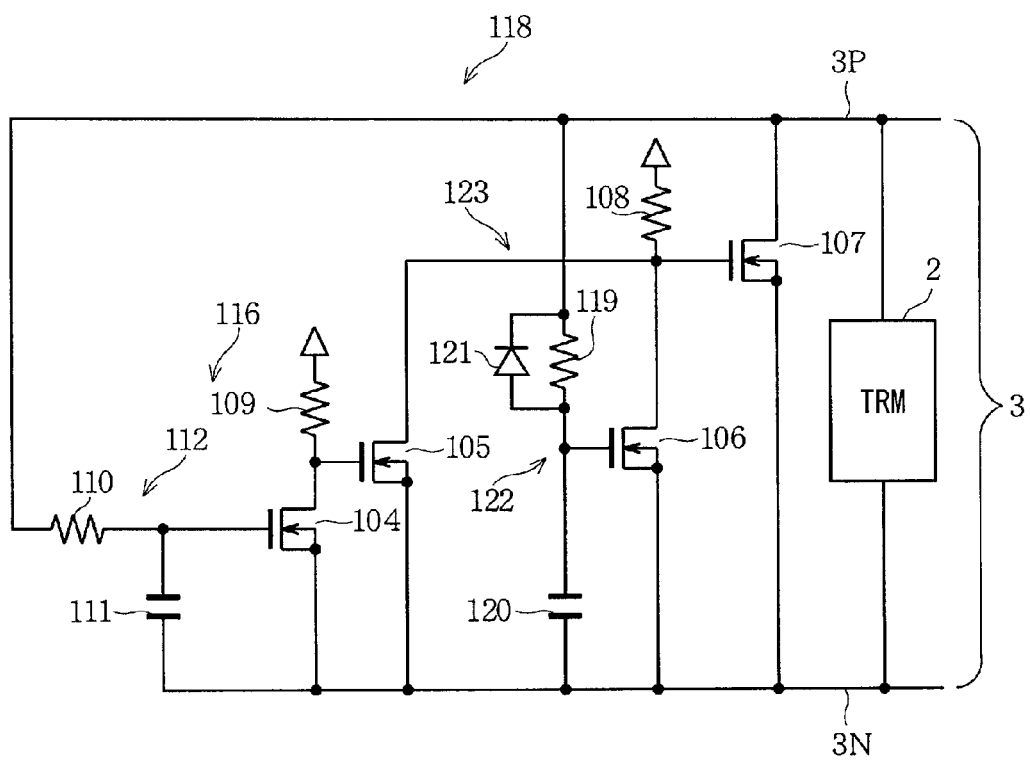
FIG. 15 is a circuit diagram of a ringing suppression circuit according to a ninth embodiment.

As shown in FIG. 28, a ringing suppression circuit 135 is similar to the ringing suppression circuit 118 of the ninth embodiment (FIG. 15). The ringing suppression circuit 135 is however different in that a P-channel MOSFET 134 is connected as a shut-off element between the drain of the FET 105 and the drain of the FET 106. The standby signal is applied to the gate (control terminal) of the FET 134.

The sixteenth embodiment operates as follows.

When the controller IC 33 operates to perform communication in a normal operation mode, the standby signal is low level (inactive) and the FET 134 is in the on-state. The ringing suppression circuit 135 thus operates in the same manner as in the ninth embodiment. When the controller IC 33 changes its mode to the standby mode or state, the standby signal changes to be active (power source Vcc level) and the FET 134 turns off.

Even when the differential voltage is not transmitted through the transmission line 3 and is 0 V (low level), the FET 105 maintains its on-state because its gate is pulled up. As a result, a current flows from the power source to the signal line 3N through the resistor 108 and the FET 105. However, by turning off the FET 134, the current flowing as described above is shut off to reduce power consumption.

A simulation result of the fourteenth embodiment is shown in FIG. 29, in which differential signal waveforms are illustrated with respect to two cases where the FET 134 is provided (FIG. 28) and not provided (FIG. 15). By adding the FET 134, a resistance of the current path connecting to the gate of the FET 107 is increased by an amount of the on-resistance of the FET 134. However, the waveforms do not differ between the two cases. It is thus understood that the FET 134 does not adversely affect the ringing suppression operation.

As described above, the controller IC 33 controls on-off of the FET 134 connected between the gate of the FET 107 and the drain of the FET 105. The controller IC 33 applies the standby signal, which changes the communication node 31 to the standby state, to the gate of the FET 134 so that the FET 134 is turned off in a period of mode change of the communication node 31 to the standby state. It is not likely that the communication is performed in this mode changing period of the communication node 31. For this reason, by turning off the FET 134 by the standby signal, the current flow path from the power source to the low potential signal line 3N side through the FET 105 is shut off. Thus, unnecessary power consumption is reduced.

(Fifteenth Embodiment)

Figure 31:
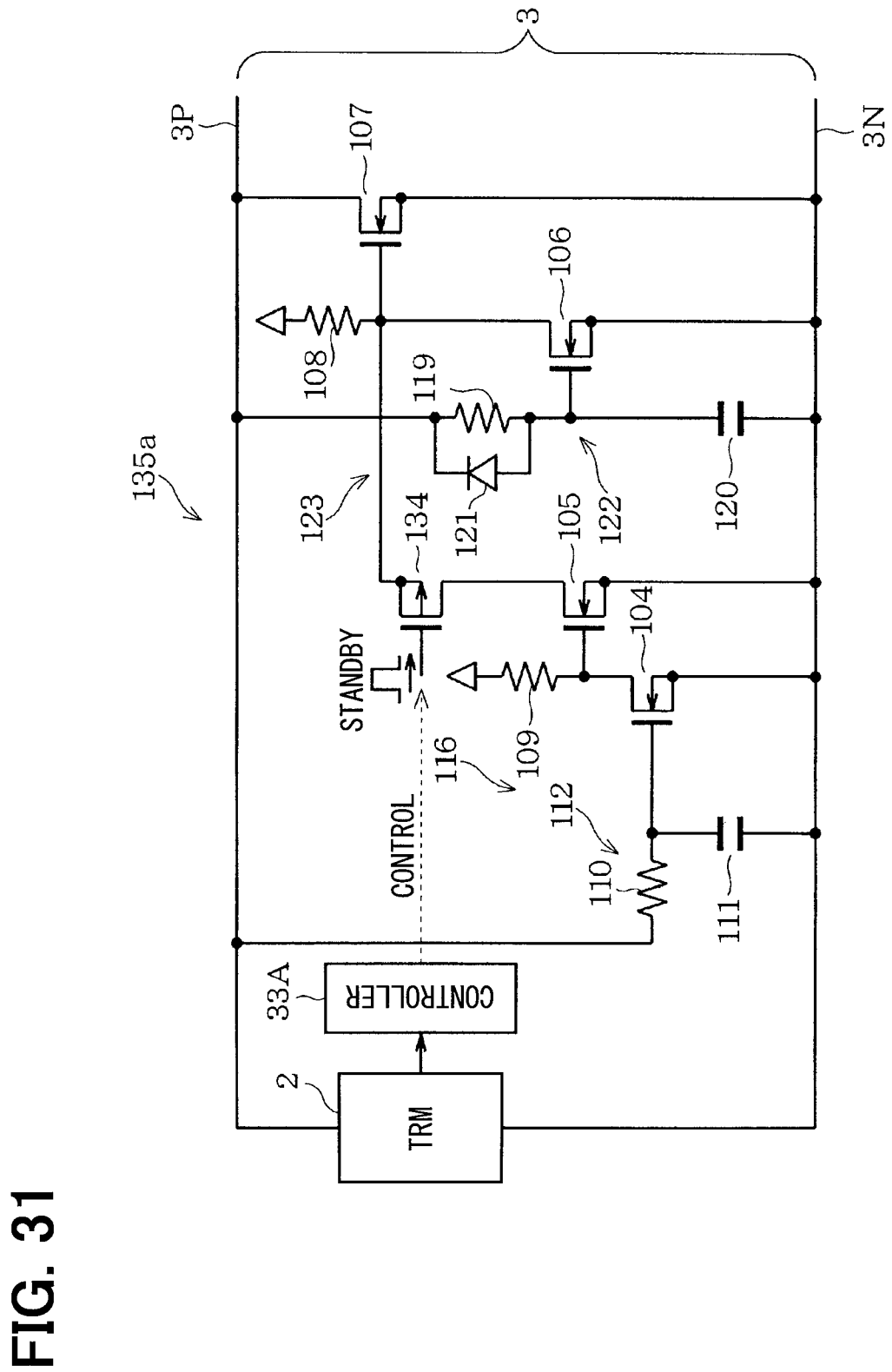
FIG. 31 is a circuit diagram showing a ringing suppression circuit according to a fifteenth embodiment.
Figure 32:
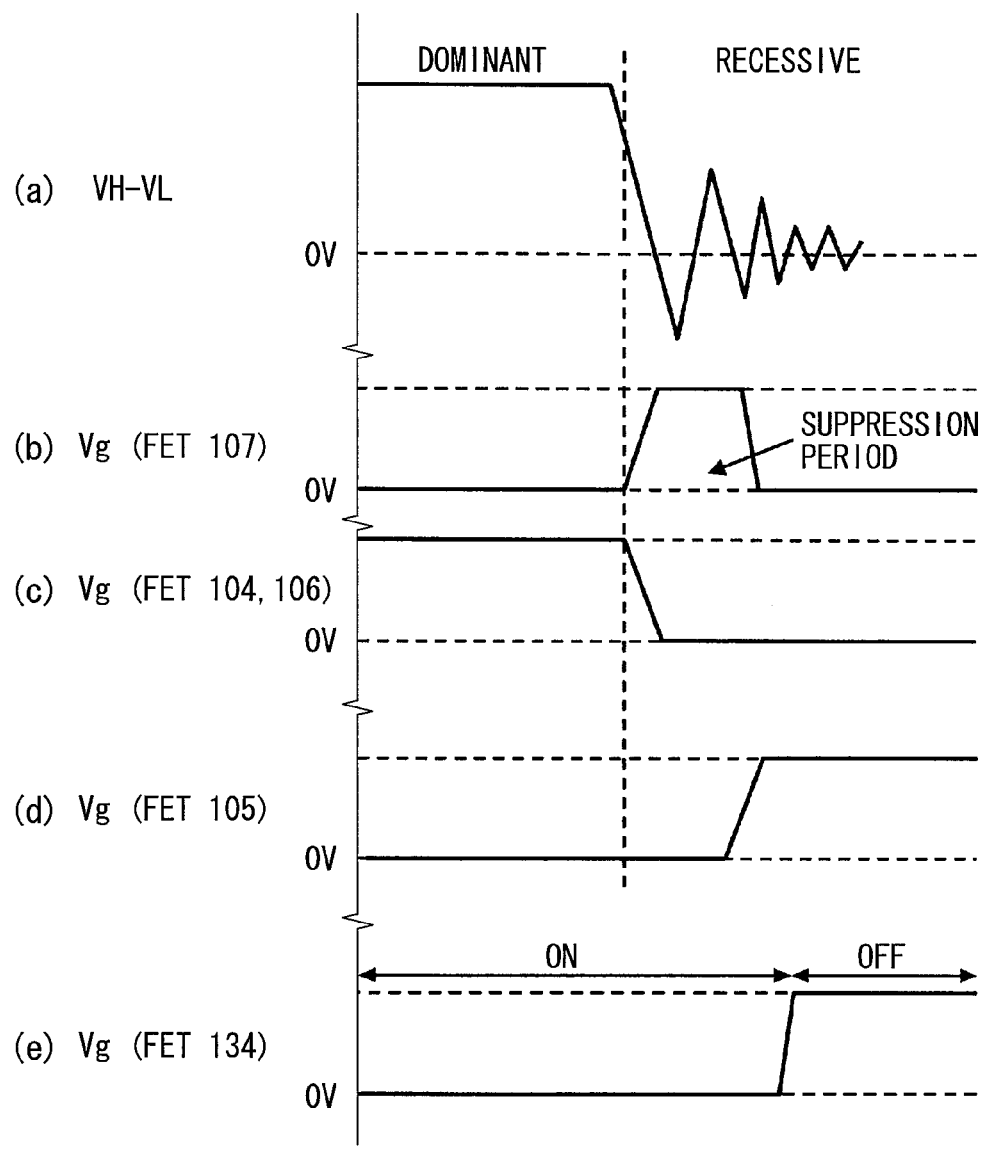
FIG. 32 is a time chart that illustrates an operation of the circuit shown in FIG. 31.

In a fifteenth embodiment shown in FIGS. 31 and 32, a ringing suppression circuit 135a has the FET 134 as in the tenth embodiment. That is, the FET 134 is provided between the drain of the FET 105 and the drain of the FET 106. The receiver circuit 2 includes a circuit configuration for checking whether the differential signal is transmitted by the transmission line 3. For example, the receiver circuit 2 is configured to detect the differential voltage of the transmission line 3 by a differential amplifier circuit and compare an output signal of the differential amplifier circuit with a predetermined threshold voltage by a comparator for checking whether a signal of a dominant level is received.

An output signal of the comparator is inputted from the receiver circuit 2 to a controller IC (controller circuit) 33A. Specifically, a high level signal is inputted to the controller IC 33A when the differential voltage of the transmission line 3 exceeds or higher than the threshold voltage, for example, 1.0 V. The controller IC 33A applies a gate signal to the gate of the FET 134. When the input signal is at the low level and the high level, the gate signal is set to the high level and the low level, respectively. The ringing suppression circuit 135a operates as shown in FIG. 32, which is similar to FIG. 12. As indicated by (a) and (e) in FIG. 32, the FET 134 is turned off when the differential signal is not transmitted through the transmission line 3. Thus, the current is prevented from flowing from the power source to the signal line 3N through the resistor 108 and the FET 105.

According to the fifteenth embodiment, the receiver circuit 2 detects the differential voltage level of the transmission line 3, and, when the differential voltage level is lower than the predetermined threshold level, the controller IC 33A turns off the FET 134. Thus, power consumption is reduced when the differential signal of the transmission line 3 becomes low, that is, when power is not required.

(Sixteenth Embodiment)

Figure 33:
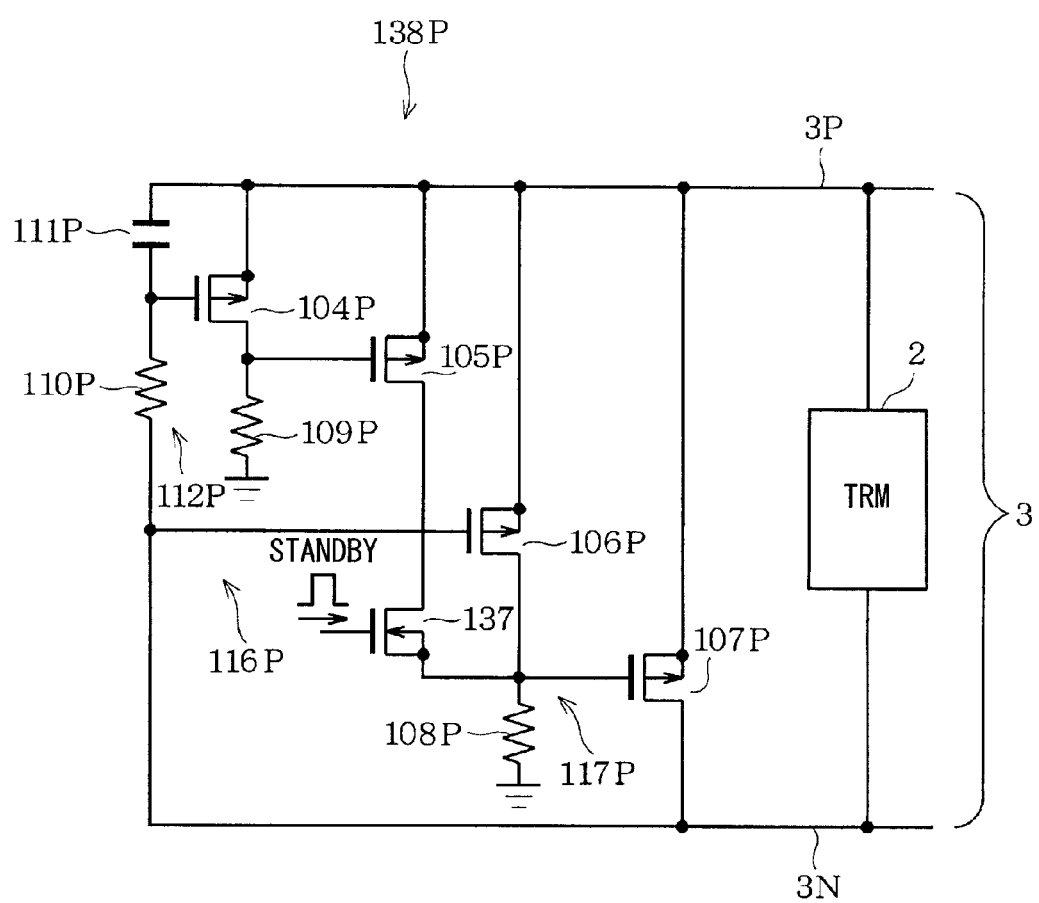
FIG. 33 is a circuit diagram of a ringing suppression circuit according to a sixteenth embodiment.

In a sixteenth embodiment shown in FIG. 33, a ringing suppression circuit 138P is provided by applying the ringing suppression circuit 135 in the fourteenth embodiment (FIG. 28) to the ringing suppression circuit 115P of the eleventh embodiment (FIG. 18). Specifically, a N-channel MOSFET 137 is connected as the shut-off element between the drain of the FET 105P and the gate of the FET 107 and the drain of the FET 106P. A gate control signal is applied to the gate of the FET 137 in the similar manner as in the fourteenth embodiment or the fifteenth embodiment. However, the signal level is opposite.

According to the sixteenth embodiment, the ringing suppression circuit 138P formed of the FETs reduces unnecessary power consumption.

The thirteenth embodiment to the sixteenth embodiment may be applied to other embodiments. For example, the fifteenth embodiment and the sixteenth embodiment may be combined.

The ringing suppression circuits according to the above-described embodiments may be modified in various ways. For example, although the ringing suppression circuit connected to at least one node of the transmission line, the ringing suppression circuit may be connected to the vicinity of each transmission node. The first and second inter-line switching elements may be configured by the same conduction type element. The diode that configures the inversion circuit may be connected as necessary. A switching element is not limited to a MOSFET, but may be any voltage driven type element. The ringing suppression circuit may be configured to suppress ringing that is generated in a case when the differential signal level changes from low to high. Without being limited to a CAN, application is possible to a communication protocol that transmits a differential signal by a pair of signal lines. The delay circuit is not limited to the RC filter circuit but may be a delay line or the like.

What is claimed is:

1. A ringing suppression circuit for suppressing ringing generated in transmission of a differential signal through a transmission line, which is formed of a pair of a high potential side signal line and a low potential side signal line, the ringing suppression circuit comprising:
   a single inter-line switching element of a voltage driven type connected between the pair of signal lines; and
   a control section for turning on the inter-line switching element for a fixed period when a change in a level of the differential signal is detected,
   wherein the control section includes:
   an inversion circuit for inverting and outputting the level of the differential signal; and
   a delay circuit that outputs the level of the differential signal after delaying for the fixed period,
   the inversion circuit and the delay circuit being configured to generate a logical product signal of a signal output from the inversion circuit and a signal output from the delay circuit and output the logical product signal to a control terminal of the inter-line switching element, wherein
   the inversion circuit includes a first switching element of a voltage driven type having a control terminal connected to one of the pair of signal lines, a potential reference side conductive terminal connected to the other of the pair of signal lines and a non-reference side conductive terminal connected to the inter-line switching element;
   the delay circuit includes a second switching element of a voltage driven type connected to the first switching element in parallel, an RC filter circuit and a third switching element of a voltage driven type, the third switching element having a potential reference side conductive terminal connected to a potential reference side conductive terminal of the second switching element, a non-reference side conductive terminal connected to a control terminal of the second switching element; and
   the RC filter circuit is connected between one of the pair of signal lines and the control terminal of the second switching element.

2. The ringing suppression circuit according to claim 1, wherein:
   the inter-line switching element is an output N-channel MOSFET having a gate pulled up via a pull-up resistor, a drain connected to the high potential side signal line and a source connected to the low potential side signal line;
   the first switching element is a first N-channel MOSFET having a gate connected to the high potential side signal line, a drain connected to the gate of the output N-channel MOSFET and a source connected to the low potential side signal line;
   the second switching element is a second N-channel MOSFET connected to the first N-channel MOSFET in parallel; and
   the third switching element is a third N-channel MOSFET having a drain pulled up via a pull-up resistor and a source connected to the low potential side signal line.

* * * * *